(12) United States Patent
Bigden et al.

(10) Patent No.: US 6,944,959 B2
(45) Date of Patent: Sep. 20, 2005

(54) CLAMPING ARRANGEMENT FOR RECEIVING A SAW BLADE IN MULTIPLE ORIENTATIONS

(75) Inventors: Jonathan D. C. Bigden, Baltimore, MD (US); Stephen C. Dassoulas, Baltimore, MD (US); Jason R. Melvin, Towson, MD (US); Robert G. Moores, Jr., Reistertown, MD (US); Jeffrey P. Grant, Forest Hill, MD (US); James J. Derreth, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 151 days.

(21) Appl. No.: 10/337,232

(22) Filed: Jan. 6, 2003

(65) Prior Publication Data

US 2003/0167643 A1 Sep. 11, 2003

Related U.S. Application Data

(63) Continuation-in-part of application No. 09/955,374, filed on Sep. 17, 2001, now Pat. No. 6,502,317, which is a continuation of application No. 09/416,819, filed on Oct. 12, 1999, now Pat. No. 6,295,736, which is a continuation-in-part of application No. 09/057,788, filed on Apr. 9, 1998, now Pat. No. 6,023,848, which is a continuation-in-part of application No. 08/881,091, filed on Jun. 24, 1997, now Pat. No. 6,009,627, which is a continuation-in-part of application No. 08/744,023, filed on Nov. 5, 1996, now Pat. No. 5,794,352, which is a continuation-in-part of application No. 08/504,050, filed on Jun. 9, 1995, now Pat. No. 5,647,133.

(51) Int. Cl.[7] .............................................. B23D 51/10
(52) U.S. Cl. ......................... 30/392; 279/127; 279/137
(58) Field of Search .................... 30/392–394; 279/127, 279/137, 87, 76

(56) References Cited

U.S. PATENT DOCUMENTS

| 1,578,475 A | 3/1926 | Sideman |
| 2,101,362 A | 12/1937 | Davidson |
| 2,539,574 A | 1/1951 | Fulmer |
| 2,735,685 A | 2/1956 | Karr ........................... 279/44 |

(Continued)

FOREIGN PATENT DOCUMENTS

| DE | 90 06 197.7 | 6/1990 |
| DE | 41 02 011 | 1/1996 |
| DE | 195 32 494 | 3/1997 |
| DE | 298 10 746 | 10/1998 |

(Continued)

OTHER PUBLICATIONS

Communication—European Search Report dated May 4, 2004.

Primary Examiner—Douglas D Watts
(74) Attorney, Agent, or Firm—Harness, Dickey & Pierce, P.L.C.

(57) ABSTRACT

A saw blade clamping arrangement for a power tool includes a clamp support, a biasing member and an actuation member. The clamp support is interconnected with the drive shaft for reciprocating motion with the drive shaft relative to a housing of the power tool. The clamp support is configured to selectively receive a saw blade of the power tool in various orientations. A release lever is carried by the housing and is manually rotated to move a control member between a first position in which the saw blade is coupled to the drive shaft and a second position in which the saw blade may be displaced from the drive shaft. In at least one of the orientations, the saw blade is positioned offset from the drive shaft and proximate one of the side walls of the tool housing to allow for flush cutting of a work piece.

44 Claims, 16 Drawing Sheets

U.S. PATENT DOCUMENTS

| | | | | |
|---|---|---|---|---|
| 3,028,890 A | * | 4/1962 | Atkinson et al. | 30/375 |
| 3,360,021 A | | 12/1967 | Mejia | 143/68 |
| 3,412,767 A | * | 11/1968 | Green, Jr. | 30/392 |
| 3,528,463 A | | 9/1970 | Mejia | 143/68 |
| 3,542,097 A | | 11/1970 | Dubek | |
| 3,555,678 A | | 1/1971 | Agulnick | |
| 3,750,283 A | | 8/1973 | Hoffman | |
| 3,823,473 A | | 7/1974 | Hoffman | |
| 3,927,893 A | | 12/1975 | Dillon et al. | |
| 4,020,555 A | | 5/1977 | Hedrick | |
| 4,106,181 A | | 8/1978 | Mattchen | |
| 4,204,692 A | | 5/1980 | Hoffman | |
| 4,243,342 A | | 1/1981 | Marto | |
| 4,294,013 A | | 10/1981 | Krieg | |
| 4,441,255 A | | 4/1984 | Hoffman | |
| 4,470,196 A | | 9/1984 | Hoffman | |
| 4,528,753 A | | 7/1985 | Kuhlman | |
| 4,577,875 A | | 3/1986 | Miyakawa | |
| 4,594,781 A | | 6/1986 | Hoffmann | |
| 4,601,477 A | | 7/1986 | Barrett et al. | |
| 4,648,182 A | | 3/1987 | Hoffmann | |
| 5,062,749 A | | 11/1991 | Sheets | |
| 5,103,565 A | | 4/1992 | Holzer, Jr. | |
| 5,165,173 A | | 11/1992 | Miller | |
| 5,263,972 A | | 11/1993 | Evans et al. | |
| 5,306,025 A | | 4/1994 | Langhoff | |
| 5,322,302 A | | 6/1994 | Quirijnen | |
| 5,324,052 A | | 6/1994 | Ortmann | |
| 5,443,276 A | | 8/1995 | Nasser et al. | |
| 5,458,346 A | | 10/1995 | Briggs | |
| 5,461,947 A | | 10/1995 | Batten | |
| 5,487,221 A | | 1/1996 | Oda et al. | |
| 5,573,255 A | | 11/1996 | Salpaka | |
| 5,575,071 A | | 11/1996 | Phillips et al. | |
| 5,647,133 A | | 7/1997 | Dassoulas et al. | |
| 5,697,279 A | | 12/1997 | Schnizler et al. | |
| 5,724,741 A | | 3/1998 | Bednar | |
| 5,794,352 A | | 8/1998 | Dassoulas | |
| 5,810,367 A | | 9/1998 | Holzer, Jr. et al. | |
| 5,903,983 A | | 5/1999 | Jungmann et al. | |
| 5,940,977 A | * | 8/1999 | Moores, Jr. | 30/392 |
| 5,946,810 A | | 9/1999 | Hoelderlin et al. | |
| 6,009,627 A | | 1/2000 | Dassoulas et al. | |
| 6,023,848 A | | 2/2000 | Dassoulas et al. | |
| 6,047,477 A | | 4/2000 | Di Nicolantonio | |
| 6,209,208 B1 | | 4/2001 | Marinkovich et al. | |
| 6,233,833 B1 | | 5/2001 | Grant et al. | 30/392 |
| 6,260,281 B1 | | 7/2001 | Okumura et al. | |
| 6,276,065 B1 | | 8/2001 | Osada et al. | |
| 6,282,797 B1 | | 9/2001 | Osada et al. | |
| 6,295,736 B1 | | 10/2001 | Dassoulas et al. | |
| 6,502,317 B2 | | 1/2003 | Dassoulas et al. | |
| 6,508,151 B1 | | 1/2003 | Neitzell | |
| 2002/0138991 A1 | | 10/2002 | Tachibana et al. | |
| 2003/0051352 A1 | | 3/2003 | Clark, Jr. | |
| 2003/0145472 A1 | | 8/2003 | Swift | |

FOREIGN PATENT DOCUMENTS

| | | |
|---|---|---|
| DE | 200 13 789 | 1/2001 |
| DE | 101 06 051 | 8/2002 |
| EP | 0 582 326 A | 9/1994 |
| EP | 0 561 473 | 1/1998 |
| EP | 0 882 537 A2 | 12/1998 |
| EP | 0 755 313 | 7/1999 |
| EP | 1 038 624 | 9/2000 |
| EP | 1 172 167 | 1/2002 |
| EP | 0 855 239 | 4/2002 |
| EP | 0 930 121 | 4/2002 |
| EP | 1 203 628 A2 | 5/2002 |
| EP | 1 295 628 A2 | 5/2002 |
| EP | 1 295 662 A1 | 3/2003 |
| GB | 230 2060 A1 | 8/1997 |
| GB | 2 336 805 | 11/1999 |
| GB | 2 336 806 | 11/1999 |
| WO | WO 93/05915 | 9/1992 |
| WO | WO 97/31745 | 2/1997 |
| WO | WO 98/3800 | 2/1998 |
| WO | WO 00/47358 | 8/2000 |
| WO | WO 02/32607 | 4/2002 |

* cited by examiner

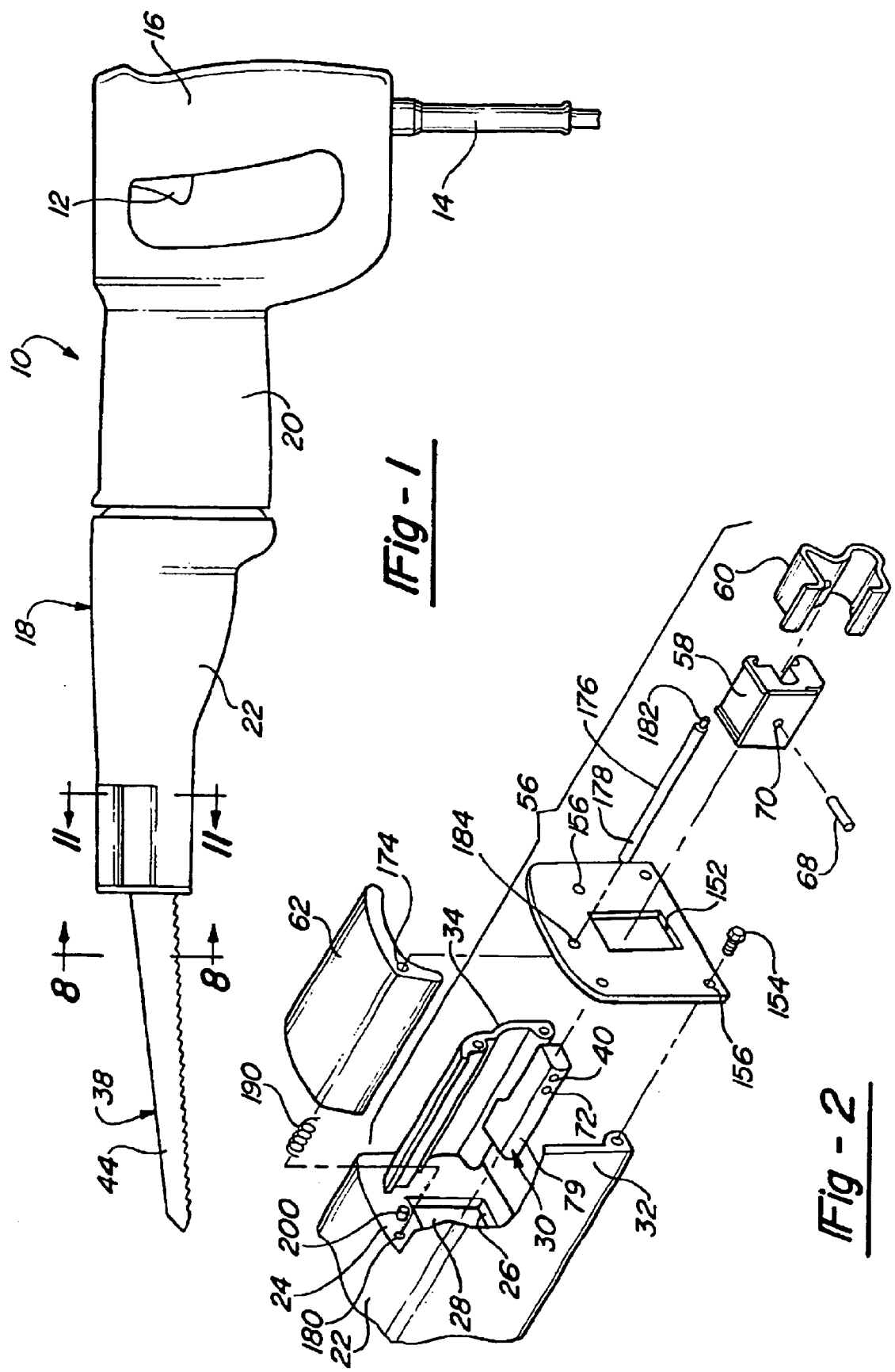

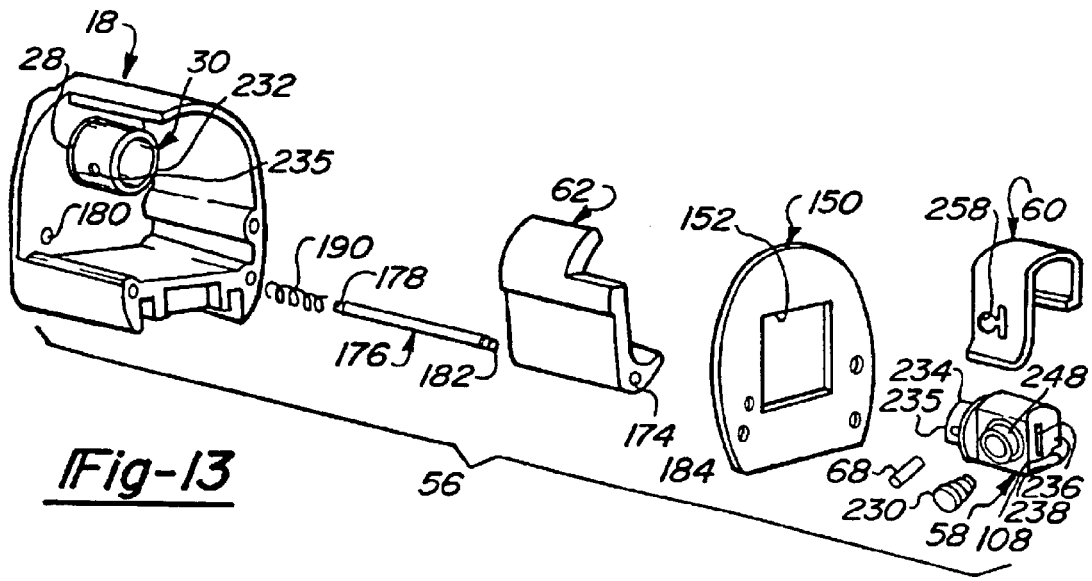
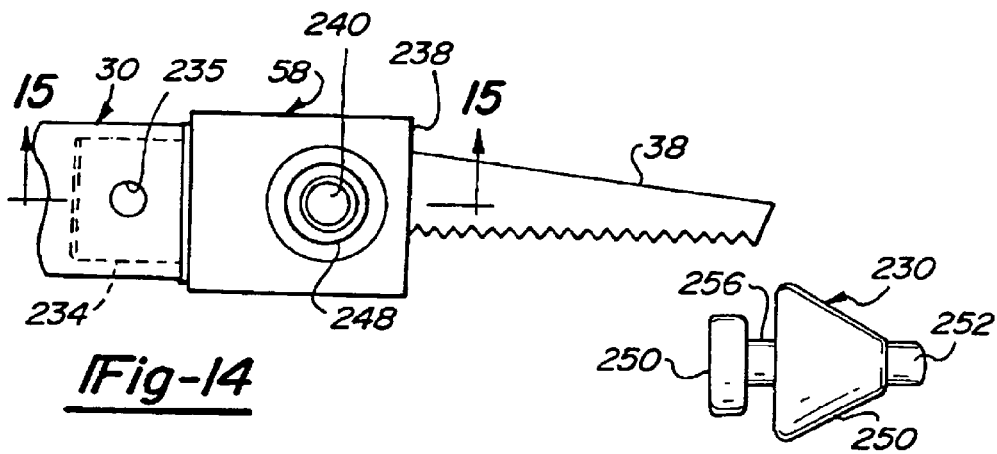
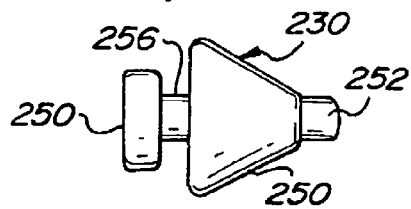
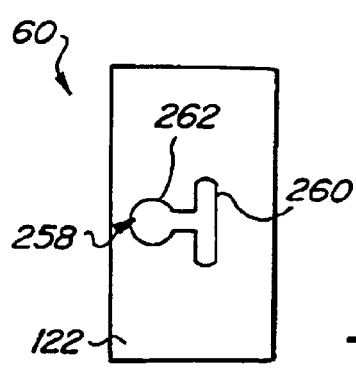

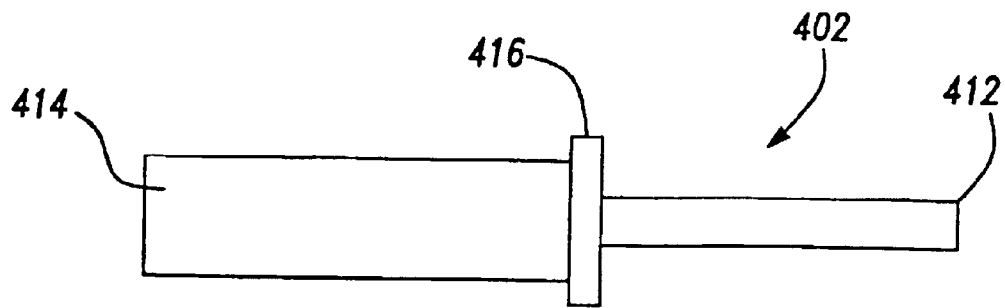
Fig-38
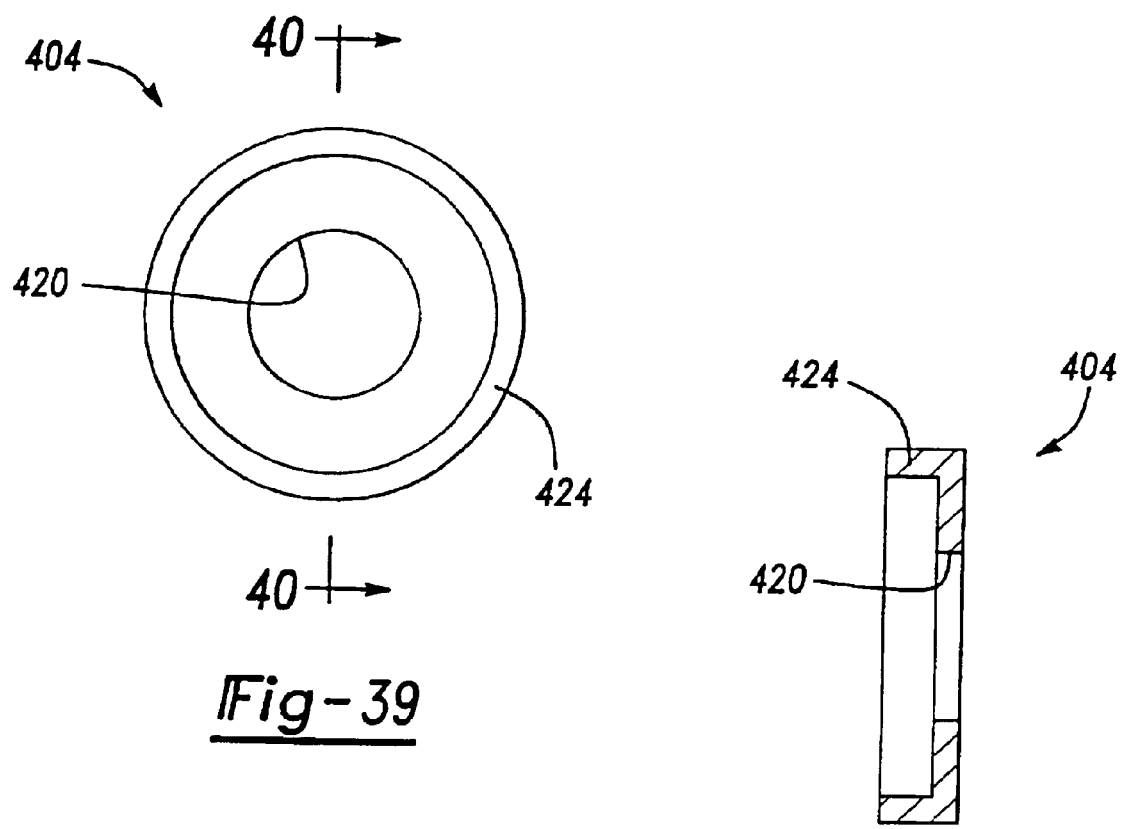
Fig-39
Fig-40

CLAMPING ARRANGEMENT FOR RECEIVING A SAW BLADE IN MULTIPLE ORIENTATIONS

CROSS-REFERENCE TO RELATED APPLICATIONS

This is a continuation-in-part application of U.S. Ser. No. 09/955,374, filed Sep. 17, 2001 (now U.S. Pat. No. 6,502, 317), which is a continuation of U.S. Ser. No. 09/416,819, filed Oct. 12, 1999 (now U.S. Pat. No. 6,295,736), which is a continuation-in-part application of U.S. Ser. No. 09/057, 788 filed Apr. 9, 1998 (now U.S. Pat. No. 6,023,848), which is a continuation-in-part application of U.S. Ser. No. 08/881, 091 filed Jun. 24, 1997 (now U.S. Pat. No. 6,009,627), which is a continuation-in-part application of U.S. Ser. No. 08/744,023 filed Nov. 5, 1996 (now U.S. Pat. No. 5,794, 352), which is a continuation-in-part application of U.S. Ser. No. 08/504,050, filed Jun. 9, 1995 (now U.S. Pat. No. 5,647,133).

FIELD OF THE INVENTION

The present invention relates in general to power tools. In particular, the present invention relates to saw blade clamping arrangements for power tools having a saw blade mounted to a shaft for reciprocating cutting motion.

BACKGROUND OF THE INVENTION

Power reciprocating saws including jigsaws and other reciprocating saws are generally referred to in the trade as "recip" saws. These saws incorporate reciprocating drive shafts. The drive shafts operate to drive generally linear saw blades along a predetermined path so as to provide one of a rectilinear or orbital cutting action.

In a conventional manner, the saw blades used with such power tools are attached to the reciprocating drive shafts through a blade holder having a slot for receiving the saw blade and a set screw which is received in a hole in the blade. The blade is clamped in place relative to the reciprocating drive shaft through tightening of the set screw. While this conventional manner of saw blade attachment has proven to be generally satisfactory and commercially successful, it is not without inherent disadvantages. For example, power reciprocating saws are subject to high vibration forces during operation which frequently result in loosening of the set screw. If the set screw does not remain sufficiently tightened, the saw blade may become disengaged from the drive shaft. An additional disadvantage with the conventional mounting of saw blades to reciprocating drive shafts relates to an inability to quickly and easily remove saw blades which become worn or fractured. Because it is often desirable to cut a work piece with minimum material loss, it is desirable to correspondingly minimize the saw blade thickness. As a result, breakage due to the forces encountered during typical use is not an uncommon occurrence. This potential frequency of blade changing makes the ease and rapidity of such action desirable. A further disadvantage of conventional blade clamping arrangements is the necessity for a separate tool such as a wrench for fixation and removal of the saw blade.

Many previous attempts have been made to overcome the disadvantages associated with the above-described conventional mounting of saw blades through elimination of the use of a set screw. However, all of these previous attempts are subject to further refinement and improvement. For example, most of the known devices are complicated and expensive to manufacture and assemble as a result of a construction including many separate parts. Additionally, operation of many of the prior devices requires application of force which is often significant for securing the saw blade in place and loosening of the blade for separation from the drive shaft. Achieving a sufficient force often requires the use of a wrench or other tool.

Conventional saw blade clamping arrangements also generally suffer from an inability to receive a saw blade in multiple orientations. To the limited extend that conventional saw blade clamping arrangements are able to receive the saw blade in multiple orientations, such arrangements are not able to cooperate with a release lever carried by a housing of the tool. Additionally, such arrangements typically require complicated mechanisms for alternatively securing the saw blade to the drive shaft in the various orientations.

It remains a need in the pertinent art to provide a saw blade clamping arrangement for a reciprocating saw that overcomes the above and other disadvantages associated with the prior art. In a similar regard, it remains a continuous goal of the pertinent art to improve cutting flexibility of reciprocating saws to avoid obstacles while retaining cutting efficiencies and quality.

SUMMARY OF THE INVENTION

The present invention provides various embodiments to saw blade clamping arrangements for reciprocating power tools that overcome disadvantages associated with the prior art. More particularly, the present invention provides a new and improved saw blade clamping arrangement for a power reciprocating saw which includes a release lever operative to permit quick and easy installation and removal of a saw blade. The present invention also provides a new and improved saw blade clamping arrangement for a power reciprocating saw that is operative to receive the saw blade in multiple orientations.

In the preferred embodiments of the present invention to be described in detail below, the release lever is pivotally mounted for movement between two positions. Further in the preferred embodiments, the release lever is not interconnected with the drive shaft for reciprocating movement therewith. Rather, the release lever is pivotally attached to the housing, thereby reducing the mass carried by the reciprocating shaft.

Advantageously, the present invention provides a saw blade clamping arrangement for a power reciprocating saw of simple construction which is relatively inexpensive to manufacture and assemble. Additionally, the present invention provides a blade clamping arrangement which can accommodate conventional saw blades of various constructions and which can hold the saw blade in place without the use of set screws and without the need to employ any other form of a tool. Still yet, the present invention provides a blade clamping arrangement having a design which protects its components from excessive wear and premature failure. According to one particular feature, the present invention also provides a saw blade clamping arrangement operative to receive a saw blade in multiple orientations to improve flexibility of the tool to avoid obstacles.

In one particular form, the present invention provides a saw blade clamping arrangement for a power tool including a housing, a drive shaft mounted for reciprocating motion relative to the housing, and a saw blade releasably interconnected with the drive shaft. The clamping arrangement includes a clamp body or clamp support carried by the drive shaft operative to receive the saw blade in at least mutually perpendicular two orientations. The saw blade clamping arrangement further includes a slider or control member connected to the clamp support for movement between a first position and a second position. The control member includes a first portion for selectively creating an operative connection between the saw blade and the drive shaft when the saw blade is received by the clamp support in a first of the at least two mutually perpendicular orientations. The control member further includes a second portion for selectively creating an operative connection between the saw blade and the drive shaft when the saw blade is received by the clamp support in a second of the at least two mutually perpendicular orientations.

In another particular form, the present invention similarly provides a saw blade clamping arrangement for a power tool including a housing, a drive shaft mounted for reciprocating motion relative to the housing, and a saw blade releasably interconnected with the drive shaft for reciprocating motion along a longitudinal axis. In this particular form the saw bade clamping arrangement includes a clamp support for attachment to the drive shaft that defines a vertical slot for receiving the saw blade in a vertical orientation. The clamp support further defines a horizontal slot for receiving the saw blade in a horizontal orientation. The vertical slot is spaced from the horizontal slot.

In yet another particular form, the present invention again provides a saw blade clamping arrangement for a power tool including a housing, a drive shaft mounted for reciprocating motion relative to the housing, and a saw blade releasably interconnected with the drive shaft for reciprocating motion along a longitudinal axis. The saw blade clamping arrangement includes a clamp support, a control member and a release lever. The clamp support is interconnected with the drive shaft and is configured to selectively receive the saw blade in at least two orientations. The control member is connected to the clamp support and creates an operative connection between the saw blade and the drive shaft when the saw blade is received by the clamp support in any of the at least two orientations. The control member is movable between a first position for creating the operative connection and a second position permitting removal of the saw blade. The release lever is mounted to the housing and is normally spaced from the control member. The release lever is manually movable to engage the control member and displace the control member from the first position to the second position.

BRIEF DESCRIPTION OF THE DRAWINGS

Additional objects and advantages of the present invention will become apparent from a reading of the following detailed description of the preferred embodiments which makes reference to the drawings of which:

FIG. 1 is a side elevational view of a reciprocating saw incorporating a saw blade clamping arrangement constructed in accordance with the teachings of a first preferred embodiment of the present invention.

FIG. 2 is an exploded perspective view of the saw blade clamping arrangement of the present invention.

FIG. 13 is an exploded view of a saw blade clamping arrangement constructed in accordance with the teachings of a second preferred embodiment of the present invention and a portion of a reciprocating saw.

FIG. 14 is an enlarged side view of the clamp support member of the second preferred embodiment shown in FIG. 13.

FIG. 16 is an enlarged side view of the locking pin member of the second embodiment shown in FIG. 13.

FIG. 17 is an enlarged side view of the spring clamp member of the second embodiment shown in FIG. 13.

FIG. 38 is a side view of the plunger of the fourth preferred embodiment of the present invention shown removed from the environment of FIGS. 35 and 36 for purposes of illustration.

FIG. 39 is a side view of the cap of the fourth preferred embodiment of the present invention shown removed from the environment of FIGS. 35 and 36 for purposes of illustration.

FIG. 40 is a cross-sectional view taken along the line 40—40 of FIG. 39.

DETAILED DESCRIPTION OF THE PREFERRED EMBODIMENTS

Figure 3:
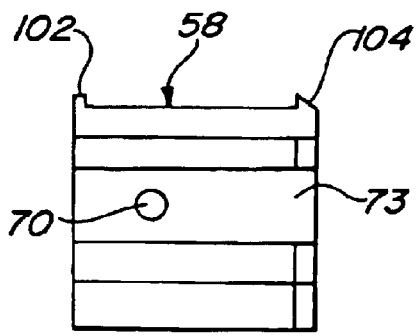
FIG. 3 is an enlarged side view of the clamp support member shown in FIG. 2.

The present invention provides an improved saw blade clamping arrangement for a power tool. While shown throughout the drawings in various embodiments for a saw blade clamping arrangement specifically adapted for a reciprocating saw, those skilled in the art will appreciate that the invention is not so limited in scope. In this regard, the various teachings of the present invention will be understood to be readily adaptable for use with any power tool incorporating one or more reciprocating cutting members (e.g., reciprocating saws, jig saws, various surgical saws and culinary knives, etc.).

Turning generally to the drawings in which identical or equivalent elements have been denoted with like reference numerals, and specifically to FIGS. 1 through 12 thereof, a first preferred embodiment of an exemplary power tool is shown. The exemplary power tool embodies the teachings of the present invention and is illustrated in FIG. 1 as a power reciprocating saw which has been identified generally at reference numeral 10. In a conventional manner, power reciprocating saw 10 is powered by a motor (not shown) that is actuated by a trigger switch 12. The delivery of electrical energy to the motor through a power cord (partially shown at 14) is controlled by trigger switch 12.

In the exemplary embodiment illustrated, power tool 10 is shown to include a handle portion 16 which carries trigger switch 12. Power tool 10 is also shown to include a housing 18 that includes a centrally located motor housing portion 20 and a forwardly located gear case housing portion 22. As shown most clearly in FIG. 2, gear case housing portion 22 is formed to include a front face 24 having a generally rectangular aperture 26 which defines the opening of a longitudinally extending drive shaft channel 28.

Power tool 10 further includes a drive shaft 30 partially extending within drive shaft channel 28 and operatively connected with a drive mechanism (not shown) housed within gear case housing portion 22. This interconnection between the drive mechanism and drive shaft 30 can be in any manner well known in the art. Drive shaft 30 is mounted for reciprocating motion generally along the longitudinal axis defined by power tool 10.

As shown in FIGS. 1 and 2, the housing 18 includes first and second forwardly extending sidewall members 32 and 34 interconnected with gear case housing portion 22. In the first preferred embodiment, first and second forwardly extending side wall members 32 and 34 are integrally formed with gear case housing 22 and are constructed of aluminum, magnesium or other suitable lightweight metal. The particular configuration and function of first and second forwardly extending sidewall members 32 and 34 will be described in detail below.

Drive shaft 30 is adapted to cooperate with a cutting member such as a saw blade 38 for driving the saw blade 38 back and forth in a cutting motion along a rectilinear path. In this regard, reciprocating drive shaft 30 is formed to include a transversely extending aperture 40 for receiving a drive pin 42 (shown in FIG. 7). An interference fit retains drive pin 42 within aperture 40. The saw blade construction shown in FIGS. 1 and 7 conventionally includes a forwardly located cutting portion 44 integrally formed with a rearwardly located mounting portion 46. In a manner well known in the art, an aperture 48 formed in mounting portion 46 of saw blade 38 receives drive pin 42 when saw blade 38 is mounted to reciprocating drive shaft 30. The exposed end of drive pin 42 extends from a first side wall 52 (shown in FIG. 8) of reciprocating shaft 30 in a dimension approximately equivalent to the thickness of saw blade 38.

Power tool 10 of the present invention further includes a clamping arrangement 56 for releasably maintaining saw blade 38 in operative connection with reciprocating drive shaft 30. Clamping arrangement 56 is shown throughout the drawings to include a clamp support member 58, a biasing member 60, and a actuation member 62. The remainder of this detailed description of the first preferred embodiment will be primarily directed to the construction and operation of clamping arrangement 56 which is the focus of the present invention.

Figure 4:
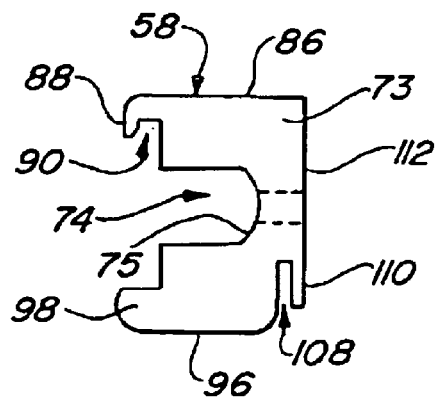
FIG. 4 is an enlarged end view of the clamp support member.
Figure 5:
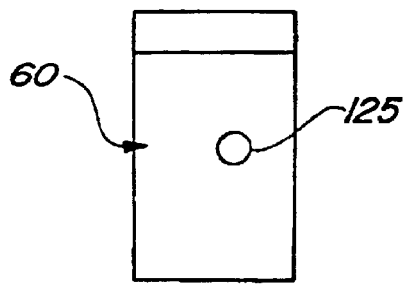
FIG. 5 is an enlarged side view of the clamp spring member shown in FIG. 2.

Referring specifically to FIGS. 3 and 4, the construction and operation of the clamp support member 58 will be described. In the exemplary embodiment shown throughout the drawings, clamp support member 58 is illustrated as a separate element which is adapted to be interconnected with reciprocating drive shaft 30 for movement therewith. However, it will be appreciated by those skilled in the art that clamp support member 58 and drive shaft 30 may alternatively be integrally formed as a single component. Clamp support member 58 is unitarily constructed of a hardened steel or other suitable material. Interconnection between clamp support members 58 and drive shaft 30 is established through a roll pin 68 in interference fit engagement with a transversely extending aperture 70 passing through clamp support member 58 and a corresponding aperture 72 disposed in reciprocating drive shaft 30.

Figure 11:
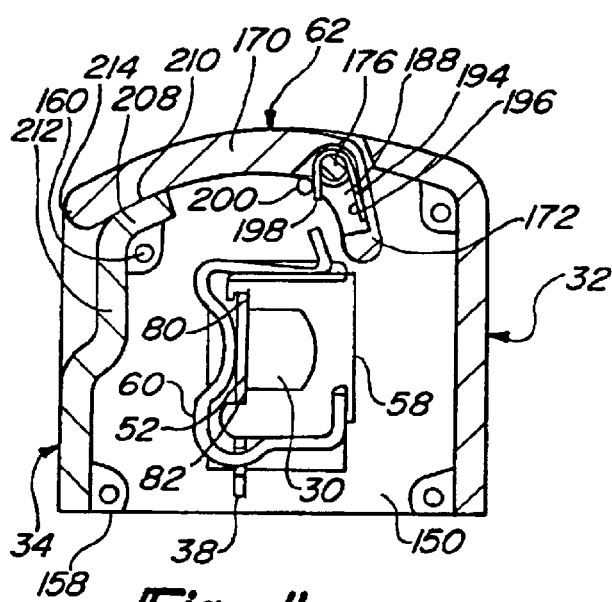
FIG. 11 is a cross-sectional view of the clamping assembly of FIG. 1 taken along the line 11—11 of FIG. 1, illustrating the release lever rotated to a first stable position in which the clamp spring member of the clamping assembly biases the saw blade into operative connection with the drive shaft.
Figure 12:
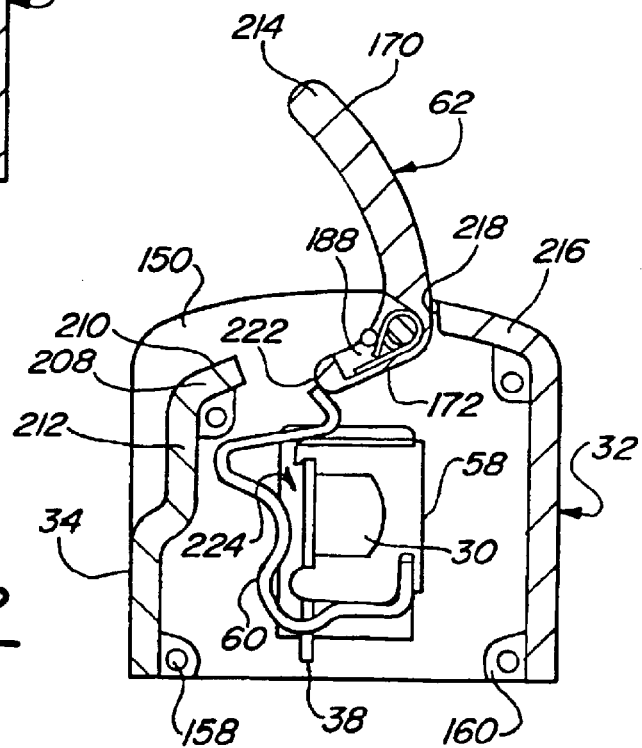
FIG. 12 is a cross-sectional view similar to that shown in FIG. 11, illustrating the release lever in a second stable position in which the clamp spring member is displaced from the saw blade by the release lever, thereby permitting the saw blade to be easily removed from the clamp assembly.

Clamp support member 58 includes a main body portion 73 which partially defines a longitudinally extending channel 74 sized to receive reciprocating drive shaft 30. More particularly, the longitudinal channel 74 is defined by an inner wall 75 and by first and second opposing side walls 76 and 78 which each terminate at end walls 80 and 82, respectively. Inner wall 75 is concavely curved to receive a second side wall 79 of reciprocating drive shaft 30. In the first preferred embodiment, a first side wall 52 of reciprocating drive shaft 30 is adapted to sit flush with end walls 80 and 82 (as shown in FIGS. 11 and 12). End walls 80 and 82 cooperate with first side wall 52 to provide a surface against which saw blade 38 is disposed when operatively connected with a power tool 10.

Adjacent an upper surface 86, clamp support member 58 is formed to integrally include an L-shaped flange 88 which partially defines a channel 90 for receiving an upper surface 94 of saw blade 38. Adjacent a lower surface 96, clamp support member 58 includes an outwardly extending portion 98 adapted to abut a lower surface 100 of saw blade 38. Upper surface 86 of clamp support member 58 includes a pair of spaced, upwardly extending flange portions 102 and 104. As will be appreciated below, flange portions 102 and 104 cooperate to limit longitudinal movement of biasing member 60. A second transversely extending channel 108 is partially defined between the main body portion 73 of clamp support member 58 and a downwardly extending portion 110 of a rear wall 112 of clamp support 58. Channel 108 is open along a bottom side.

Figure 6:
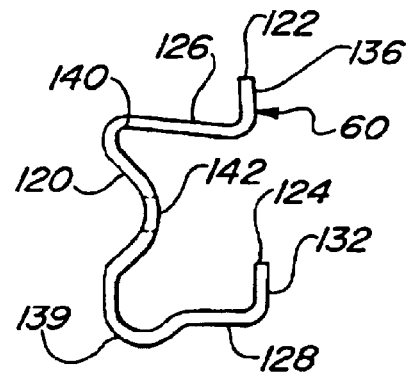
FIG. 6 is an enlarged end view of the clamp spring member.
Figure 7:
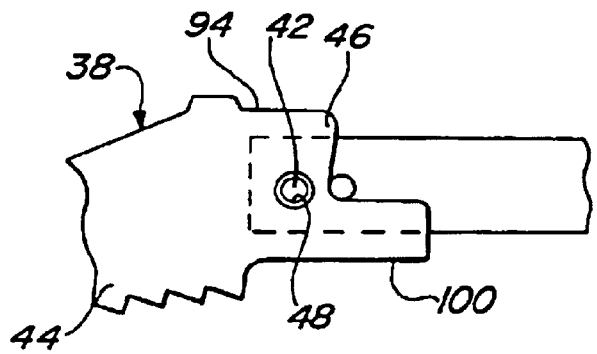
FIG. 7 is a partial side view of the saw blade clamping arrangement of FIG. 1, illustrating interconnection of the drive shaft with a conventional saw blade.
Figure 8:
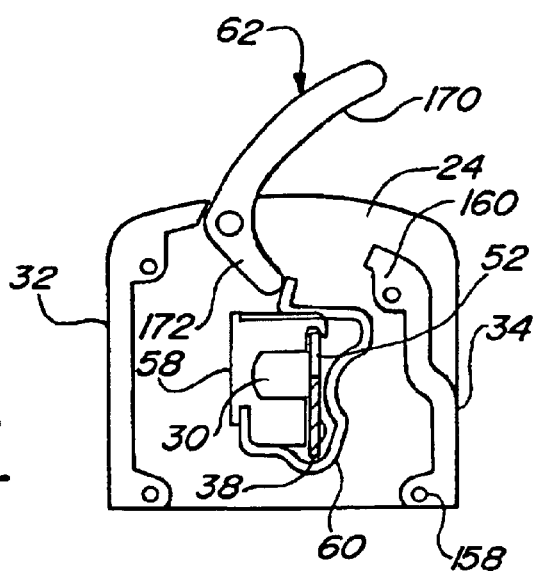
FIG. 8 is a partial cross-sectional view of the keyless saw blade clamp of FIG. 1 taken along the line 8—8 of FIG. 1 illustrated with the end plate of FIG. 2 removed for purposes of clarity.

Referring specifically to FIG. 6, the biasing member of the present invention is preferably illustrated as a spring clamp member 60. Spring clamp member 60 is adapted to be directly carried by clamp support member 58 for movement with reciprocating drive shaft 30. Spring clamp member 60 is generally C-shaped and is integrally formed of a resilient metal or other suitable material to include a curvilinear central portion 120 and first and second ends 122 and 124. In one application, spring clamp member 60 is constructed of 0.050 inch steel. A side view of clamp spring member 60 is shown in FIG. 6 in a substantially unloaded condition. An aperture 125 passes through central portion 120 which is adapted to accept an end of drive pin 42 when a saw blade is not in clamping arrangement 56.

Clamp spring member 60 further includes generally linear upper and lower segments 126 and 128 integrally attached to opposite ends of curvilinear central portion 120. Upper and lower segments 126 and 128 are disposed generally transverse to curvilinear central portion 120 and cooperate with the curvilinear central portion 120 to partially define a longitudinally extending opening 130 for receiving a portion of clamp support member 58 and reciprocal drive shaft 30.

Spring clamp member 60 is further shown to include a retaining portion 132 adjacent second end 124 which is adapted to be constrained within longitudinal channel 108 of clamp support member 58. Spring clamp member 60 further integrally includes a spring tab portion 136 adjacent first end 122 which extends upwardly relative to upper segment 126 and is angled slightly rearwardly in the direction of curvilinear central portion 120. Spring tab portion 136 is free from direct constraint with respect to clamp support member 58.

When assembled and in clamping engagement with drive shaft 30 and saw blade 38, lower segment 128 of spring clamp member 60 is positioned adjacent bottom surface 96 of clamp support member 58. In an unloaded condition, upper segment 126 of spring clamp member 60 is arranged to be positioned substantially adjacent upper surface 86 of clamp support member 58. As discussed above, longitudinal translation of spring clamp member 60 is limited by flange portions 102 and 104 of clamp support member 58.

Curvilinear central portion 120 includes a lower, outwardly curved segment 139 which accommodates saw blade 38 and an upper, outwardly curved segment 140. Curvilinear central portion 120 further includes an inwardly curved central portion 142 arranged to directly contact saw blade 38. It will be appreciated by those skilled in the art that the particular construction of spring clamp 60 is subject to modification without departing from the scope of the present invention. Any construction will be suitable which incorporates a portion for fixation to clamp support member 58, a portion for directly biasing saw blade 38 and a displaceable free end.

While in a clamping position such as that shown in FIG. 11, clamp spring member 60 functions to exert a biasing force against saw blade 38 through contact of central portion 142 and saw blade 38. The biasing force serves to retain saw blade 38 in operative connection with reciprocating drive shaft 30 by preventing saw blade 38 from moving transversely with respect to drive shaft 30.

Figure 9:
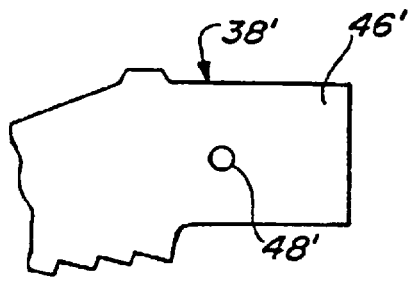
FIG. 9 is a partial view of a mounting portion of a first alternative saw blade configuration acceptable for use with the saw blade clamping arrangement of the present invention.
Figure 10:
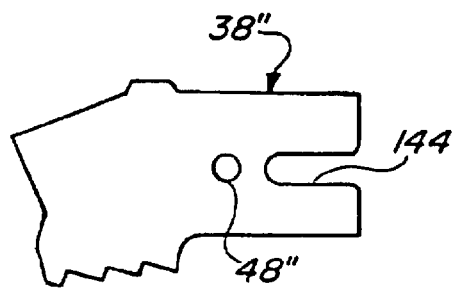
FIG. 10 is a partial view of a mounting portion of a second alternative saw blade configuration acceptable for use with the keyless saw blade clamping arrangement of the present invention.

It will be appreciated by those skilled in the art that clamping arrangement 56 of the present invention is able to accommodate saw blades of various configurations without modification. By way of example and not of limitation, two alternative saw blade constructions suitable for use with clamping arrangement 56 are illustrated in FIGS. 9 and 10. Referring to FIG. 9, a first alternative saw blade 38' includes a generally rectangular mounting portion 46' formed with an aperture 48' sized to receive drive pin 42. In FIG. 10, a second alternative saw blade 38" is shown to include an aperture 48" and a longitudinally extending slot 144. Any of a number of other known saw blade constructions may be releasably interconnected to drive shaft 30 through clamping arrangement 56 of the present invention.

As shown throughout the drawings, actuation member of the present invention is preferably illustrated as a release lever 62 operative to overcome the biasing force of spring clamp member 60 and thereby facilitate removal and replacement of saw blade 38. In the exemplary embodiment illustrated, release lever 62 is mounted for pivotal movement between a first stable position or clamped position (shown in FIG. 11) and a second stable position or unclamped position (shown in FIG. 12). Significantly, when release lever 62 is in its first stable position, it is spaced apart from spring clamp member 60 permitting release lever 62 to remain longitudinally fixed with respect to housing 18. Thus, release lever 62 remains relatively stationary as reciprocating drive shaft 30 operates, thereby reducing the weight translated back and forth by drive shaft 30 and also reducing attendant vibration forces.

To facilitate pivotal mounting of release lever 62, power tool 10 further includes an end plate 150 interconnected with first and second forwardly extending sidewall members 32 and 34. As shown in FIG. 2, end plate 150 is generally planar and has a configuration similar to front face 24 of gear case housing 22. End plate 150 includes an aperture 152 through which saw blade 38 is permitted to pass. In the embodiment illustrated, end plate 150 is attached to first and second forwardly extending side wall members 32 and 34 by a plurality of threaded fasteners 154 adapted to pass through four apertures 156 provided in the end plate. Fasteners 154 are adapted to engage threaded holes 158 located in boss portions 160 on each of the forwardly extending side walls members 32 and 34. In the embodiment illustrated, boss portions 160 are located along the free ends of first and second forwardly extending side wall members 32 and 34. It will be appreciated by those skilled in the art that end plate 150 can be alternatively attached to forwardly extending side wall members 32 and 34 in any of a number of other well known manners. In this regard, it is anticipated that end plate 150 could alternatively be welded to forwardly extending side walls members 32 and 34.

Release lever 62 has a generally L-shaped cross section including a first leg 170 and a second leg 172. The longitudinal length of release lever 62 is sufficient to extend along the entire travel path of spring clamp member 60 as drive shaft 30 is reciprocated. A longitudinally extending aperture 174 passes through the length of release lever 62 at the junction of first and second legs 170 and 172 and is adapted to receive a pivot pin 176. Pivot pin 176 includes a first end 178 adapted to engage an aperture 180 formed in front face 24 and a second end 182 adapted to engage an aperture 184 located in end plate 150. Second end 182 is of a reduced diameter so as to prevent forward translation of pin 176.

As shown in FIGS. 11 and 12, release lever 62 is formed to include a recess or pocket 188 configured to accommodate a torsion spring 190. Torsion spring 190 functions to bias release lever 62 towards its first stable position (as shown in FIG. 11) and includes a central portion surrounding an adjacent portion of pivot pin 176. Torsion spring 190 also includes a fixed end 194 in engagement with a boss portion 196 of recess 188. Torsion spring 190 further includes a free end 198 adapted to engage a stop pin 200 extending from front face 24 of gear case housing 22. Stop pin extends into recess 180 to avoid interference with release lever 62.

As shown most clearly in FIGS. 11 and 12, second forwardly extending wall member 34 is generally S-shaped in cross section and includes an upper segment 208 providing a stop surface 210 arranged to support release lever 62. Upper segment 208 serves to prevent further rotation of release lever 62 in a counterclockwise direction as shown in FIGS. 11 and 12. First leg 170 of release lever 62 transversely extends slightly beyond an upper vertical segment 212 of second forwardly extending wall member 34 so that the operator can grasp a free end 214 of first leg 170.

First forwardly extending side wall member 32 is generally L-shaped in cross-section and is formed along the perimeter of a corresponding portion of front face 24 of gear case housing 22. An upper segment 216 of second forwardly extending side wall member 34 terminates at a stop surface 218 for engaging release lever 62 when release lever 62 is rotated to its second stable position (as shown in FIG. 12).

Second leg 172 of release lever 62 includes an engagement surface 222 adapted to contact spring tab portion 136 of spring clamp member 60. As shown in FIG. 12, clockwise rotation of release lever 62 about a longitudinal pivot axis defined by pivot pin 176 results in contact between engagement surface 216 of second leg 172 and spring tab portion 136 of spring clamp member 60. The length of second leg 172 is significantly less than the length of first leg 170, thereby providing a mechanical advantage for overcoming the biasing force exerted by spring clamp member 60.

The pivot axis of release lever 62 defined by pivot pin 176 is disposed relative to engagement surface 222 of second leg 172 so as to provide an over-centered relationship therebetween. As a result, as release lever 62 approaches its second stable position (as shown in FIG. 12), the opposing biasing force of spring clamp member 60 urges release lever 62 against stop surface 218 of first forwardly extending wall portion 32.

With particular reference to FIGS. 11 and 12, the operation of the clamping arrangement 56 of the present invention heretofore detailed will now be described. Beginning with saw blade 38 operatively connected to reciprocating drive shaft 30, release lever 62 is rotated in a clockwise direction from its first stable position (shown in FIG. 11) by manual urging of first leg 170 to overcome the biasing force of torsion spring 190. Initial clockwise rotation causes second leg 172 of release lever 62 to engage spring tab portion 136 of spring clamp member 62.

Continued clockwise rotation of release lever 62 serves to transversely displace spring tab portion 136 and to overcome the biasing force of spring clamp member 62 by elastically deforming spring clamp member 60. More specifically, elastic displacement of spring tab portion 136 creates a gap 224 between curvilinear central portion 120 of spring clamp member 60 and saw blade 38. As release lever 62 approaches its second stable position, the over-centered relation between engagement surface 222 of second leg 172 and the pivot axis defined by pivot pin 176 causes the biasing force of spring clamp member 60 to further urge release lever 62 in a clockwise direction against stop surface 218. At this point, release lever 62 will stay in its second stable position until urged in the direction of its first stable position. As a result, both of the operator hands are free for handling replacement of saw blade 38 or other necessary tasks.

Saw blade 38 can now be removed from power tool 10 and a new blade can be inserted into gap 224 between spring clamp member 60 and reciprocating drive shaft 30. Upper edge 94 of saw blade 38 is located in channel 90 and aperture 48 is positioned over drive pin 42. Operating interconnection between saw blade 38 and reciprocating drive shaft 30 is established by manual urging of release lever 62 in a counterclockwise direction. Following initial counterclockwise movement of lever 62, the biasing force of spring clamp member 60 urges release lever 62 to its first stable position.

Turning now to FIGS. 13–19 of the drawings, a saw blade clamping arrangement 56' constructed in accordance with the second preferred embodiment of the present invention will now be described. In this second embodiment, components similar to those identified with respect to the first embodiment will be designated in the drawings with corresponding reference numerals. As with the first preferred embodiment, saw blade clamping arrangement 56' is operative for use with power tool 10 such as a reciprocating saw or other tool including a reciprocating drive shaft 30.

As with the first preferred embodiment of the present invention, the saw blade clamping arrangement 56' of the second preferred embodiment includes a clamp support member 58, a biasing member 60 and an actuation member 62. The saw blade clamping arrangement 56' of the second preferred embodiment departs from the first preferred embodiment in that it additionally incorporates a locking member 230 operative to selectively engage saw blade 38 and interconnect saw blade 38 to drive shaft 30. The remainder of this detailed description of the second preferred embodiment will address departures in construction and function of the second preferred embodiment from the first preferred embodiment.

As shown in FIG. 13, drive shaft 30 of the second preferred embodiment is generally cylindrical and includes an open distal end 232 for receiving a first end 234 of clamp support member 58. In the exemplary embodiment illustrated, first end 234 of clamp support member 58 and drive shaft 30 are interconnected by pin 68 which engages cooperating apertures 235 located in first end 234 and shaft 30. However, it will be appreciated by those skilled in the art that any suitable manner may be utilized to operatively interconnect clamp support member 58 with drive shaft 30. For example, clamp support member 58 and shaft 30 may alternatively be press fit together and brazed.

Figure 15:
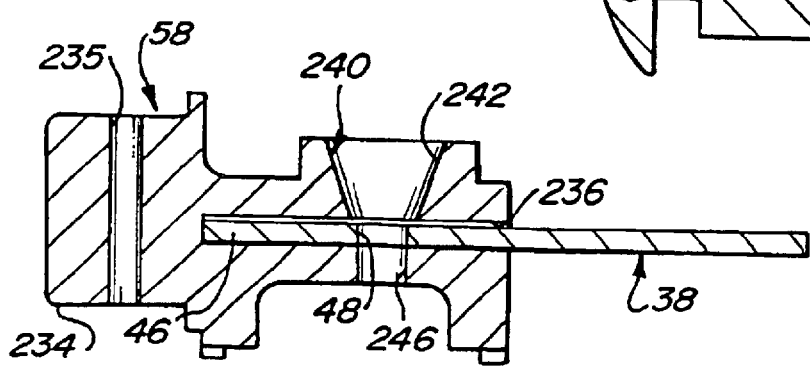
FIG. 15 is a cross-sectional view taken along the line 15—15 of FIG. 14.

With reference to FIGS. 14 and 15, clamp support member 58 is shown to include a generally rectangular channel 236 partially extending longitudinally therethrough. Rectangular channel 236 is open adjacent a second end 238, or distal end, of clamp support member 58 and is configured to receive mounting portion 46 of saw blade 38. Clamp support member 58 further includes a transversely extending recess 240 having a generally conical portion 242 and a reduced diameter cylindrical portion 246. Reduced diameter cylindrical portion 246 is arranged to align with aperture 48 in mounting portion 46 of saw blade 38 upon insertion of saw blade 38 into channel 236. Conical portion 242 is partially defined by an upwardly extending cylindrical flange 248. As will become apparent below, recess 240 is configured to cooperatively receive locking member 230.

With continued reference to FIG. 13 and additional reference to FIG. 16, locking member 230 is shown to include a generally conical portion 250 configured to cooperate with conical portion 242 of recess 240. In a similar manner, locking member 230 includes a generally cylindrical portion 252 adapted for insertion into cylindrical portion 246 of recess 240. When locking member 230 is seated into recess 240 of clamp support member 58, cylindrical portion 252 intersects rectangular channel 236 and engages aperture 48 in mounting portion 46 of saw blade 38, thereby operatively interconnecting saw blade 38 with clamp support member 58. Locking member 230 is shown to further include a head 254 interconnected to conical portion 250 through a reduced diameter portion 256.

With reference now to FIGS. 13 and 17, biasing member 60 of the second preferred embodiment will now be described. As with the first preferred embodiment, biasing member 60 of the second preferred embodiment is a spring clamp member 60 adapted to be directly carried by clamp support member 58 for movement with drive shaft 30. Spring clamp member 60 includes a first end 122 displaceable by actuation member 62 and a second end 124 constrained with respect to clamp support member 58. Second end 124 is constrained within longitudinal channel 108 of clamp support member 58. Spring clamp member 60 normally functions to bias locking member 230 to a seated position within recess 240 of clamp support member 58 and thereby operatively interconnect clamp support member 58 and saw blade 38.

As most clearly shown in FIG. 17, spring clamp member 60 includes an aperture 258 disposed adjacent first end 122. Aperture 258 includes an elongated portion 260 interconnected to a circular portion 262. In use, head 250 of locking member 230 is inserted through circular portion 262 of aperture 258 and reduced diameter portion 256 of locking member 230 is positioned within elongated portion 260. As first end 122 of spring clamp member 60 is deflected by actuation member 62, reduced diameter portion 256 of locking member 230 is permitted to translate within elongated portion 260.

As with the first preferred embodiment, the release lever 62 of the second preferred embodiment is pivotally interconnected to housing 18 for movement between a first position and a second position. In this regard, pivot pin 176 passes through longitudinally extending aperture 174. First end 182 engages aperture 184 formed in cover plate 150. Similarly, second end 178 engages aperture 180.

Figure 18:
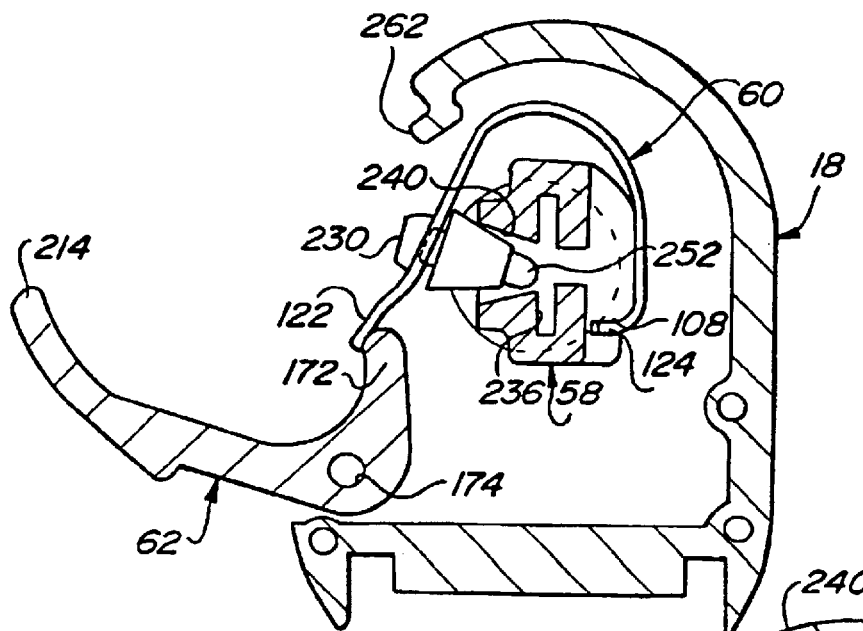
FIG. 18 is a partial cross-sectional view of the saw blade clamping arrangement of FIG. 13, illustrating the lever rotated to a first position in which the locking pin member is displaced from the slot which receives the saw blade, thereby permitting the saw blade to be easily removed or inserted from the clamp support member.
Figure 19:
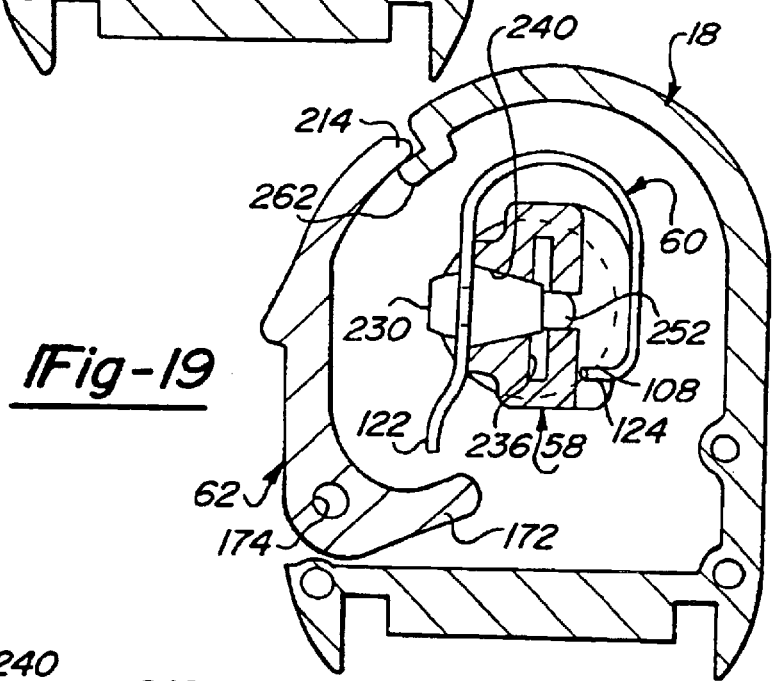
FIG. 19 is a partial cross-sectional view similar to that shown in FIG. 18, illustrating the release lever in a second position in which the clamp spring member biases the locking pin member into a locked position for retaining the saw blade within the slot.

In the first position (as shown in FIG. 19), release lever 62 is spaced apart from spring clamp member 60 and does not reciprocate with drive shaft 30. Free end 214 of release lever 62 abuts a lip 262 formed with housing 18 to prevent further rotation of release lever 62 in a clockwise direction as shown in the drawings. In its second position (as shown in FIG. 18), release lever 62 displaces first end 122 of spring clamp member 60, thereby partially removing locking member 230 from recess 240. As a result, cylindrical portion 252 is withdrawn from channel 236 and aperture 48 of saw blade 38, thereby permitting removal of saw blade 38.

Turning now to FIGS. 20–31 of the drawings, a saw blade clamping arrangement 56" constructed in accordance with the third preferred embodiment of the present invention will now be described. Again, components similar to those identified with respect to the first embodiment will be designated in the drawings with corresponding reference numerals. As with the first and second preferred embodiments, saw blade clamping arrangement 56" is operative for use with power tool 10 such as reciprocating saw or other tool including a reciprocating drive shaft 30.

As with the first preferred embodiment of the present invention, saw blade clamping arrangement 56" of the third preferred embodiment includes a support member 58, a biasing member 60 and an actuation member 62. Saw blade clamping arrangement 56" of the third preferred embodiment departs from the first preferred embodiment in that it additionally incorporates a locking member 310 operatively interconnect saw blade 38 to drive shaft 30, a control member 312 operative to displace locking member 310, and a collar 314 movably supporting control member 312. The remainder of this detailed description will address departures in construction and function of the third preferred embodiment from the prior embodiments.

As with the second preferred embodiment, drive shaft 30 of the third preferred embodiment is generally cylindrical and includes an open distal end 232 for receiving a first end 234 of support member 58. Preferably, first end 234 of support member 58 and shaft 30 are press-fit together and brazed. Alternatively, it will be appreciated by those skilled in the art that any suitable manner may be utilized to operatively interconnect support member 58 with drive shaft 30.

Figure 25:
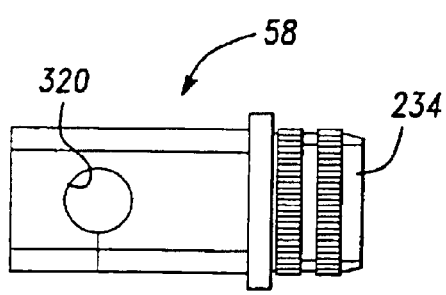
FIG. 25 is a top view of the clamp support member of FIG. 24.
Figure 26:
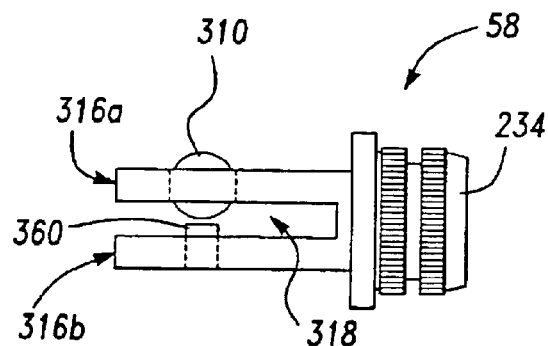
FIG. 26 is a top view of the clamp support member of FIG. 24.

With specific reference to FIGS. 25 and 26, clamp support member 58 of tool 56 is shown to include a pair of spaced apart legs 316. A generally rectangular channel 318 (best shown in FIG. 24) is partially defined by the pair of legs 316 and extends substantially the entire length of legs 316 and is adapted to receive mounting portion 46 of saw blade 38. Support member 58 further includes a transversely extending elongated hole 320. Aperture 320 extends through a first leg 316a and intersects rectangular channel 318. Upon insertion of saw blade 38 into channel 318, aperture 320 is substantially aligned with aperture 48 in mounting portion 46 of saw blade 38. As will become apparent immediately below, aperture 320 is configured to receive locking member 310. Locking member 310 of the third preferred embodiment is shown to preferably comprise a spherical bearing 310. Bearing 310 has a diameter slightly smaller than the width of elongated hole 320. The elongated configuration of the hole allows the bearing 310 to float and easily locate hole 48 in saw blade 38.

Figure 21:
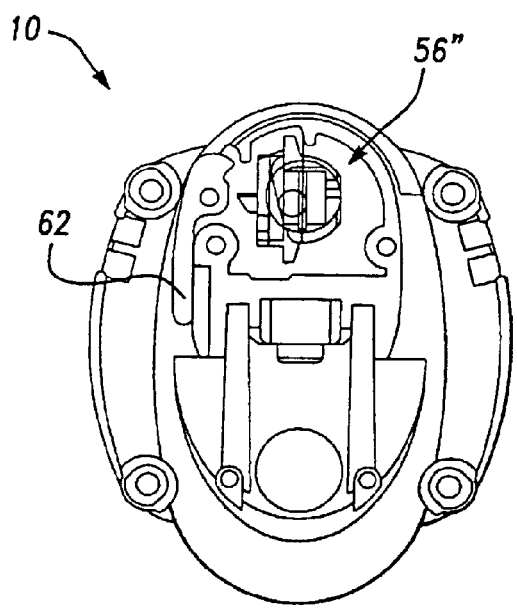
FIG. 21 is an end view of the reciprocating saw of FIG. 20, illustrating the saw blade clamping arrangement in a clamped position.
Figure 22:
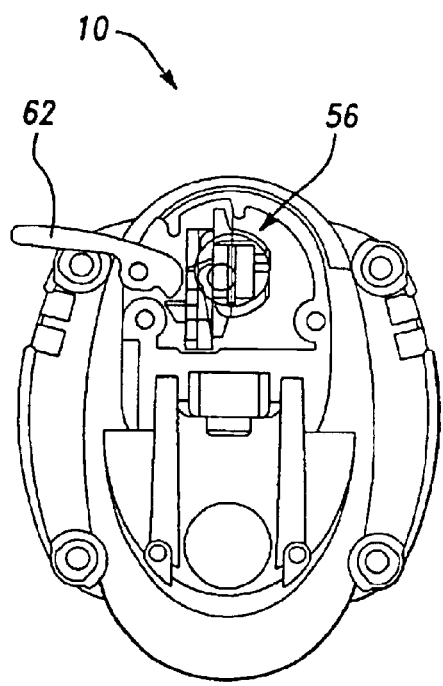
FIG. 22 is an end view similar to FIG. 21, illustrating the saw blade clamping arrangement in a release position.

With reference now to FIGS. 21, 22, 27 and 28, control member 312 of the third preferred embodiment will now be described. Control member 312 is interconnected to support member 58 so as to be linearly translatable with respect thereto. In the embodiment illustrated, control member 312 is linearly translatable in a direction substantially perpendicular to the direction of reciprocal motion of drive shaft 30 between a first position and a second position. As will be discussed further below, control member 312 is operatively retained relative to support member 58 through collar 314. Control member 312 is operative for selectively urging bearing 310 into engagement with saw blade 38 to thereby operatively engage saw blade 38 with drive shaft 30. More particularly, in a first position, as shown specifically in FIG. 21, control member 312 urges bearing 310 into engagement with saw blade 38. In this first position, bearing 310 is partially inserted into aperture 46 from a first side of saw blade 38. In its second position, as shown in FIG. 22, control member 312 permits bearing 310 to be displaced from a position engaged with aperture 46 of saw blade 38, thereby permitting removal and replacement of saw blade 38.

Figure 27:
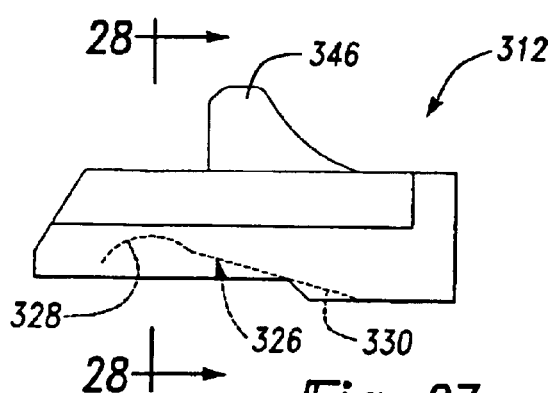
FIG. 27 is a side view of the slider member of FIG. 24.
Figure 28:
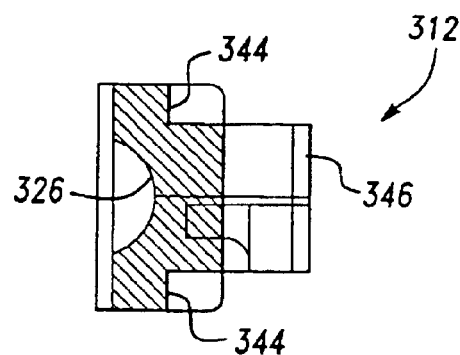
FIG. 28 is a cross-sectional view taken along the line 28—28 of FIG. 27.

With continued reference to FIG. 27 and the cross-sectional view of FIG. 28, control member 312 is shown to include a channel 326 for at least partially receiving bearing 310. The channel 326 includes a dish-shaped pocket 328 and a concavely curved trough 330. Trough 330 is defined by a camming surface which is angled such that trough 330 is most shallow at a point displaced from cavity 328. When control member 312 is in its second position (as shown in FIG. 22), locking member 310 is substantially centered within cavity 328 of channel 326. As a result, bearing 310 can be displaced from a position in which it is engaged with aperture 46 of saw blade 38. As control member 312 is moved from its second position to its first position, bearing 310 rides along trough 330. Given the angular orientation of trough 330, bearing 310 is resultantly forced toward rectangular channel 318 and into engagement with aperture 46 of saw blade 38.

Figure 29:
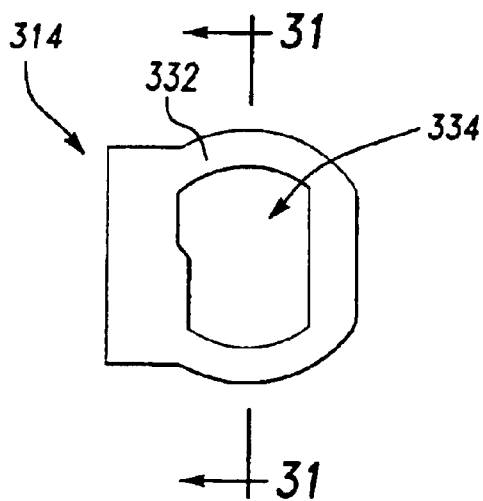
FIG. 29 is an end view of the collar of FIG. 24.
Figure 30:
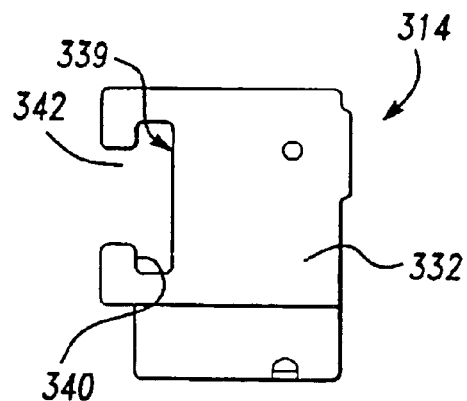
FIG. 30 is a side view of the collar of FIG. 24.
Figure 31:
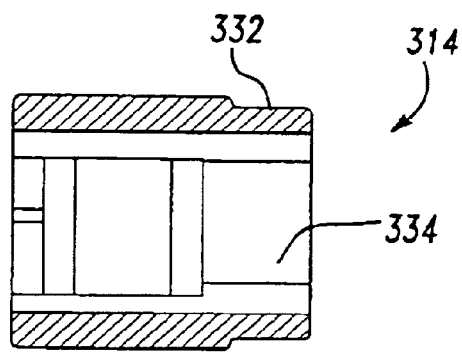
FIG. 31 is a cross-sectional view taken along the line 31—31 of FIG. 30.

With reference to FIGS. 29–31, collar 314 of the third preferred embodiment of the present invention will now be described. As noted above, collar 314 functions to interconnect control member 312 with support member 58, and in turn drive shaft 30. collar 314 includes a main body portion 332 which defines a central aperture 334 adapted to receive the pair of legs 316 of the support member 58. As a result, collar 314 effectively circumferentially surrounds support member 58. A cotter pin 336 passes through a hole 338 in main body portion 332 and a corresponding hole 340 in support member 58 to thereby releasably interconnect 314 and support member 58.

As shown specifically in FIG. 30, collar 314 defines a generally T-shaped channel 339 adapted to slidingly receive control member 312. More particular, T-shaped channel 339 includes a vertically oriented portion 340 and a horizontally oriented portion 342. Vertically oriented portion 340 is specifically adapted to receive a pair of outwardly extending flanges 344 which are integrally formed with control member 312. A flange 346 extends through horizontally oriented portion 342 and slightly beyond.

Figure 32A:
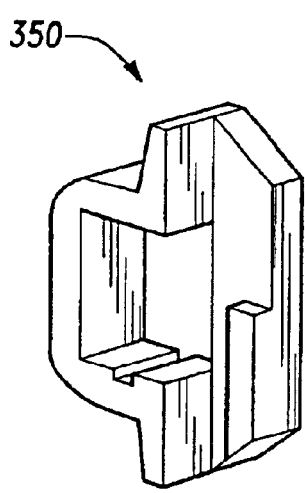
FIG. 32A is a perspective view of a first end of an outer member of an alternative collar for use with saw blade clamping arrangement of the third preferred embodiment of the present invention.
Figure 32B:
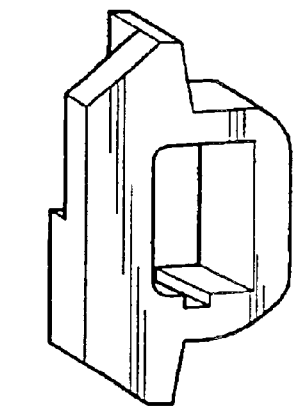
FIG. 32B is a perspective view of a second end of the outer member.
Figure 33A:
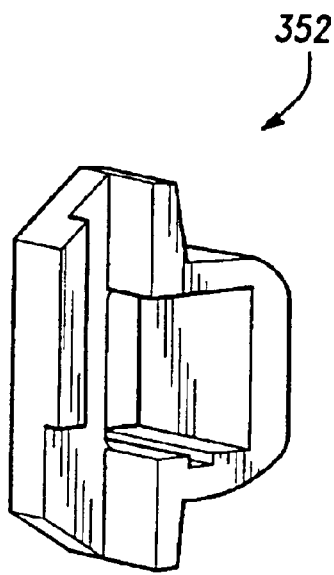
FIG. 33A is a perspective view of a first end of an inner member intended to cooperate with the outer member of FIG. 30.
Figure 33B:
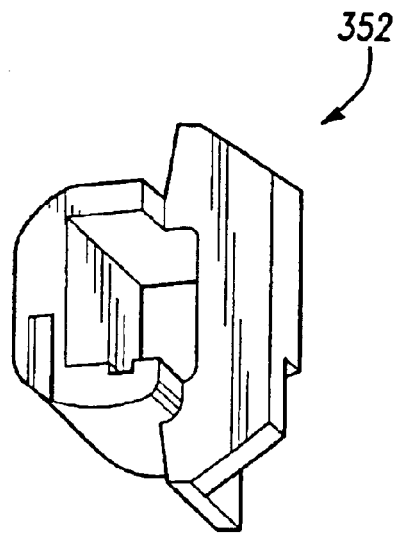
FIG. 33B is a perspective view of a second end of the inner member.
Figure 34:
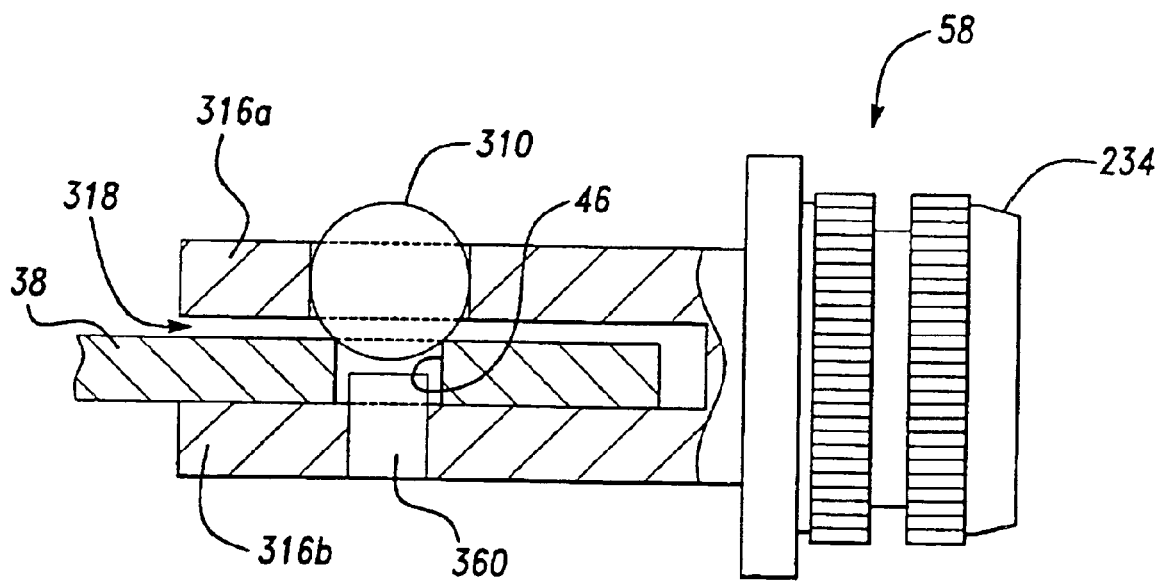
FIG. 34 is a view similar to FIG. 26, enlarged and illustrating the saw blade held in position within the clamp by the bearing and the locating pin.
Figure 35:
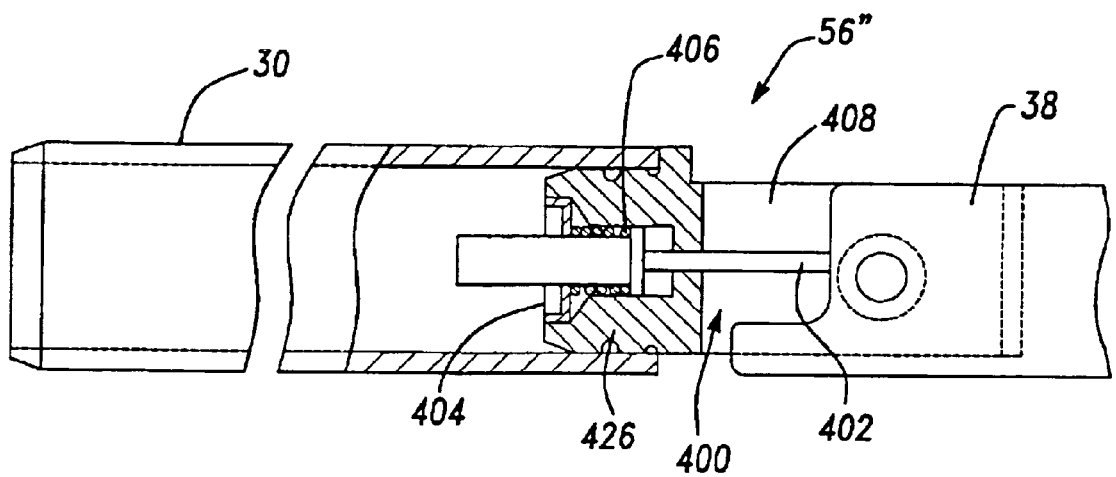
FIG. 35 is a partially cut-away view of a saw blade clamping arrangement constructed in accordance with the teachings of a fourth preferred embodiment of the present invention shown to include a saw blade ejection mechanism, the saw blade ejection mechanism shown in a retracted state.
Figure 36:
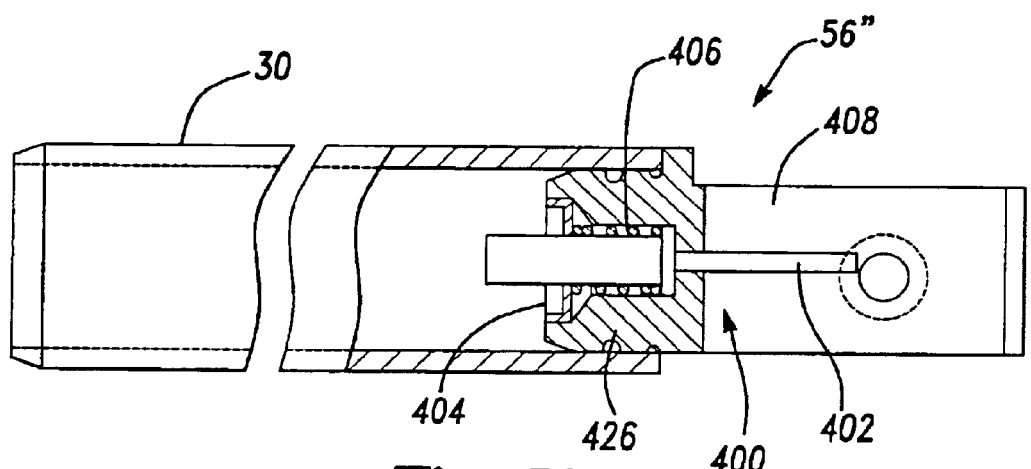
FIG. 36 is a partially cut-away view similar to FIG. 35, illustrating the saw blade ejection mechanism in an extended state.
Figure 37:
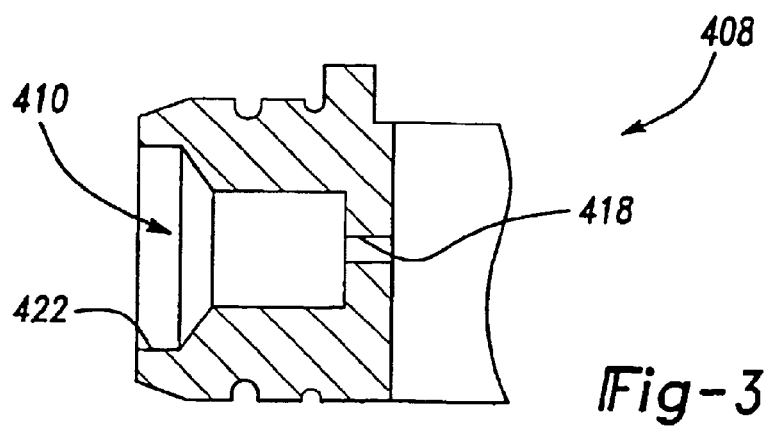
FIG. 37 is a cross-sectional view taken along the line 37—37 of FIG. 26.

It will be appreciated that in certain applications it may be desirable to provide the collar 314 in two components. For example, a two-component collar may provide manufacturing advantages. With reference to FIGS. 32 and 33, an alternative two-piece collar 314 for use with the saw blade clamping arrangement 56" of the third preferred embodiment. The collar 314 is shown to include two components, namely. An outer member 350 is shown in FIGS. 32A and 32B. An inner member 352 is shown in FIGS. 33A and 33B. The outer and inner members 350 and 352 cooperate to accomplish the functions on the collar 314 discussed above.

Figure 23:
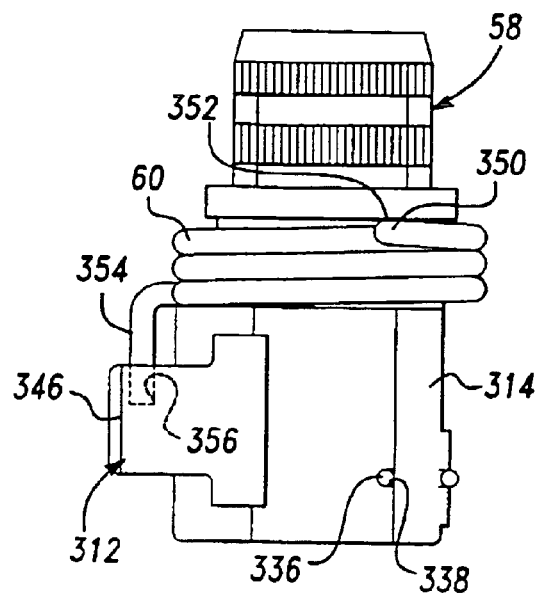
FIG. 23 is an enlarged side view of the saw blade clamping arrangement of FIG. 20 shown removed from the reciprocating saw for purposes of illustration.
Figure 24:
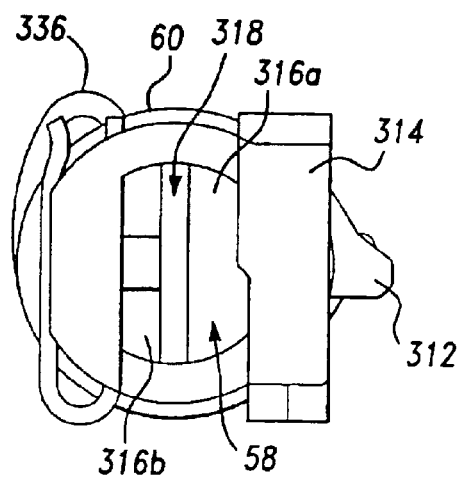
FIG. 24 is an end view of the saw blade clamping arrangement of FIG. 22.

In the embodiment illustrated, biasing member 60 comprises a coil spring 60 which circumferentially surrounds support member 58. As shown in FIG. 23, a first end 350 of coil spring 60 engages an aperture 352 formed in support member 58. A second end 354 of coil spring 60 and aperture 356 formed in flange 346 below control member 312. Coil spring 60 functions to normally bias control member 312 towards its first position (as shown in FIG. 21) in which bearing 310 is forced into engagement with aperture 46 of saw blade 38.

Figure 20:
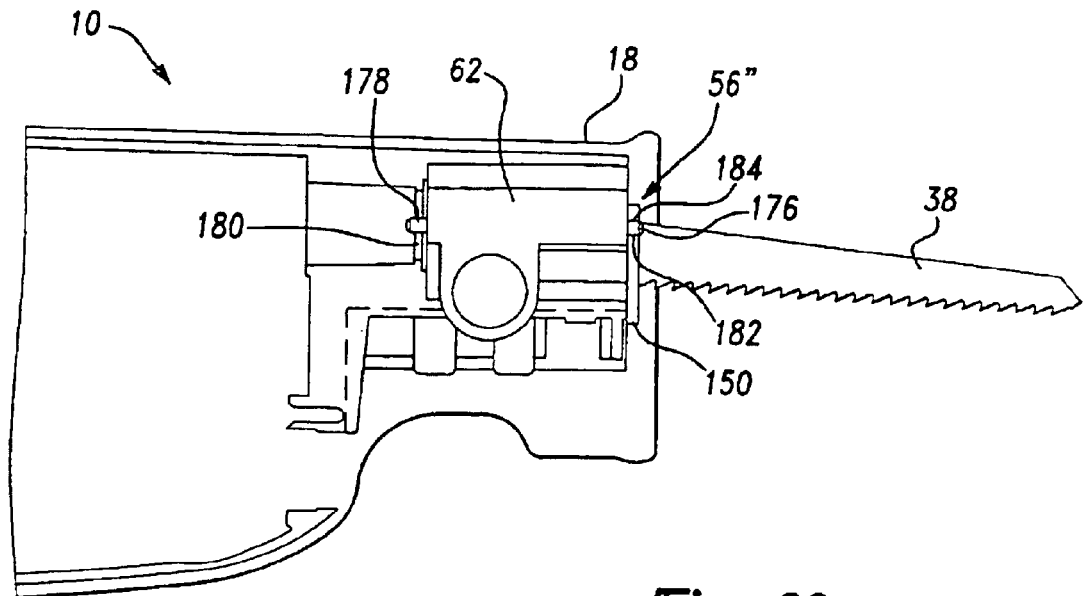
FIG. 20 is a side view of a portion of a reciprocating saw illustrated to include a partial cross-sectional view of a saw blade clamping arrangement constructed in accordance with the teachings of a third preferred embodiment of the present invention.

Referring now to FIGS. 20–22, the release lever of the third preferred embodiment is shown pivotally interconnected to housing 18 for movement between a first position (as shown in FIG. 21) and a second position (as shown in FIG. 22). In this regard, a pivot pin 176 passes through a longitudinally aperture in release lever 62. First end 182 of pivot pin 186 engages apertures 184 formed in cover plate 150. Second end 178 of pivot pin 176 engages aperture 180. Alternatively, it will be appreciated by those skilled in the art that release lever 62 can be integrally formed to include cylindrical portions extending in opposite directions and effectively replacing pivot pin 176.

In the first position, release lever 62 is spaced apart from flange 346 of control member 312. It will be appreciated that release lever 62 does not reciprocate with drive shaft 30. In its second position, release lever 62 displaces control member 312 to its second position, thereby permitting removal and replacement of saw blade 38 in the manner discussed above. In the preferred embodiment, release lever 62 of the third preferred embodiment is mounted to tool 10 such that an interference fit is established so as to maintain release lever 62 in its release position. Alternatively, release lever 62 may be mounted to tool 10 such that its second position (as shown in FIG. 22) is an over-centered position.

In the exemplary embodiment illustrated, the saw blade clamping arrangement 56" of the third preferred embodiment is shown to include a locating pin 360 which extends into the longitudinal opening of the support member 58 and is adapted to engage the aperture 46 of the saw blade 38 from a second side of the saw blade 38. Spherical bearing 310 and locating pin 360 cooperate to prevent inadvertent removal of saw blade 38 from the longitudinal slot. In this regard, locating pin 360 prevents spherical bearing 310 from being pushed out of aperture 46 when saw blade 38 is under severe loads. Locating pin 360 is adapted to seat in aperture 46 of blade 38 and accordingly serves to further lock blade 38 in place. The diameter of locating pin 360 is smaller than aperture 46 of saw blade 38, thereby permitting spherical bearing 310 and the spring force applied to spherical bearing 310 to locate blade 38 within clamp support member 58. Specifically, to prevent release of blade 38 from clamp support member 58 when spherical bearing 310 tends to slide out of the longitudinal blade opening slot, the sidewall of aperture 46 of saw blade 38 engages locating pin 360 and blade 38 is retained within clamp support member 58.

Turning now to FIGS. 35–40 of the drawings, a saw blade clamping arrangement 56''' constructed in accordance with the teachings of the fourth preferred embodiment of the present invention will now be described. The saw blade clamping arrangement 56''' of the fourth preferred embodiment will be understood to be substantially identical to the saw blade clamping arrangement 56" of the third preferred embodiment except that the clamping arrangement 56''' of the fourth preferred embodiment has been modified to include a mechanism 400 for ejecting the saw blade 38 therefrom. Components similar to those identified with regard to previously described embodiments will be designated in the drawings with corresponding reference numerals.

The ejection mechanism 400 of the fourth preferred embodiment of the present invention is illustrated to generally include a plunger 402, an end cap 404, and a coil spring 406. As with the prior embodiments, the clamping arrangement 56''' includes a mounting member or clamp support member 408. The clamp support member 408 is similar in function and construction to the clamp support member 58 with the exception that it has been modified to accommodate the plunger 402. In this regard, the clamp support member 408, which is press-fit into an end of the drive shaft 30, defines a generally cylindrical cavity 410. The cylindrical cavity 410 is shown most clearly in the cross-sectional view of FIG. 37.

The plunger is an elongated plunger 402 including a first end 412 and a second end 414. A radially extending flange 416 is disposed between the first and second ends 412 and 414. The plunger 402 is disposed within the cavity 410, with the first end 412 extending through a reduced diameter aperture 418 provided in the clamp support member 408. The second end 414 extends from an aperture 420 provided in the cap 404 which is press-fit into a countersunk portion 422 of cavity 410. The cap 404 is shown to include an axially extending flange 424.

The plunger 402 is linearly movable between a first position (shown in FIG. 36) and a second position (shown in FIG. 35) for ejection the saw blade 38 from the saw blade clamping arrangement 56'''. In the exemplary embodiment, the saw blade clamping arrangement 56''' includes a biasing member in the form of a coil spring 426 which surrounds the second end 414 of the elongated plunger 402 and biases the plunger 402 to the second position. The coil spring 426 is opposed on one side the cap 404 and on the other side by the flange 416.

When the saw blade 38 is inserted into the saw blade clamping arrangement 56''', the saw blade 38 abuts the first end 412 of the plunger 402 and displaces the plunger 402 rearwardly. This rearward translation of the plunger 402 compresses the coil spring 426 between the cap 404 and the flange 416. When removal or replacement of the saw blade 38 is desired, the release lever 62 is operated to move the saw blade clamping arrangement 56''' to its unclamped position and the biasing force of the coil spring 426 forces the plunger 402 to its second position to thereby eject the saw blade 38.

Turning now to FIGS. 41–50 of the drawings, a saw blade clamping arrangement constructed in accordance with the teachings of a fifth preferred embodiment of the present invention is illustrated and generally identified at reference character 500. As with the prior embodiment of the present invention, the saw blade clamping arrangement 500 is operative to releasably couple a saw blade 38 with a reciprocating drive shaft 30 of a power tool 10 such as reciprocating saw. Primarily, the saw blade clamping arrangement 500 of the fifth preferred embodiment of the present invention functionally differs from the remaining embodiments described herein by being able to accommodate the saw blade 38 in various orientations. As will be more appreciated below, this aspect of the present invention provides the user of the tool 10 with improved flexibility to avoid obstacles that may be encountered during cutting operations.

Figure 41:
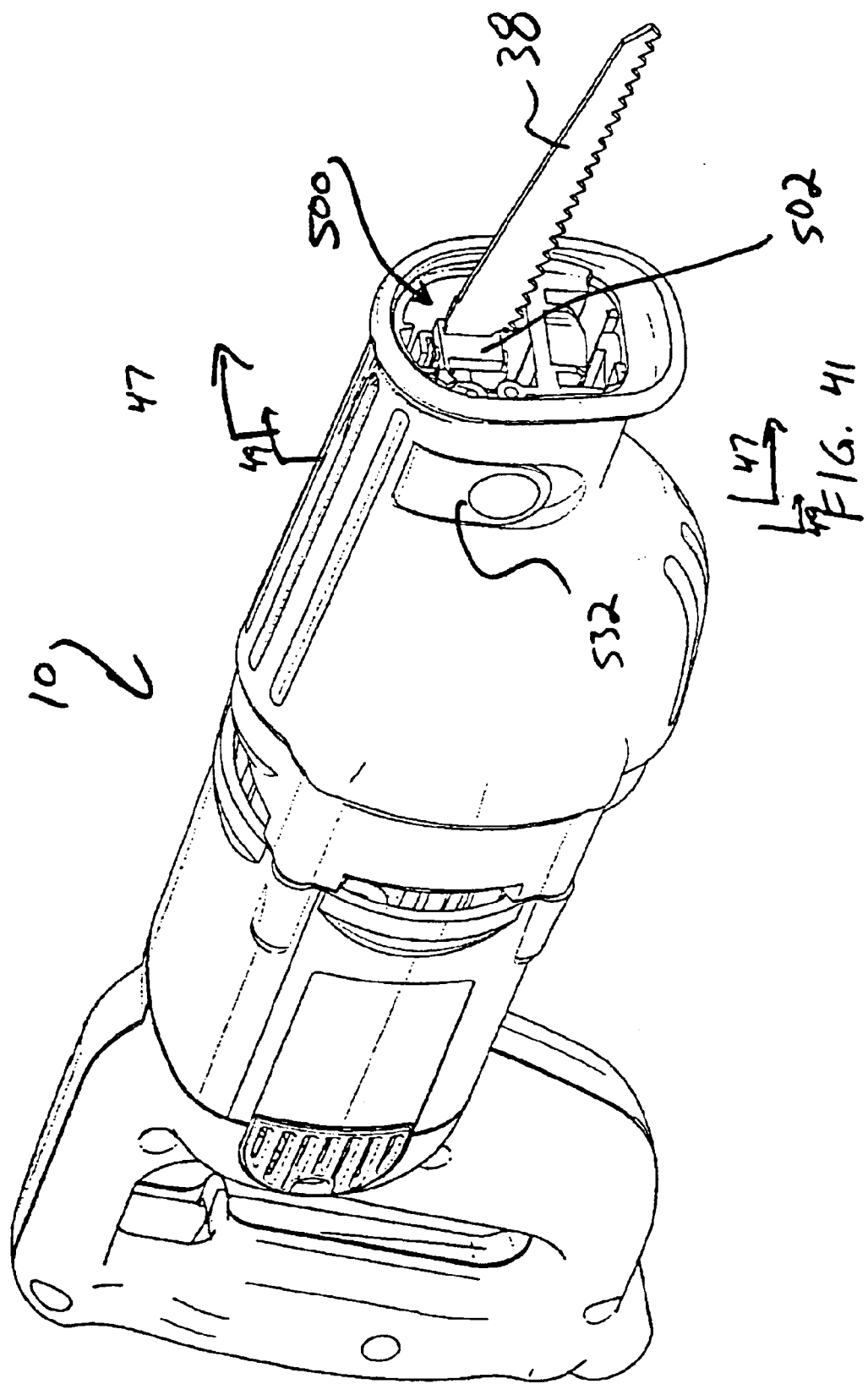
FIG. 41 is a perspective view of a reciprocating saw incorporating a saw blade clamping arrangement constructed in accordance with the teachings of a fifth preferred embodiment of the present invention, the saw blade clamping arrangement shown operatively associated with a saw blade in a first orientation.
Figure 42:
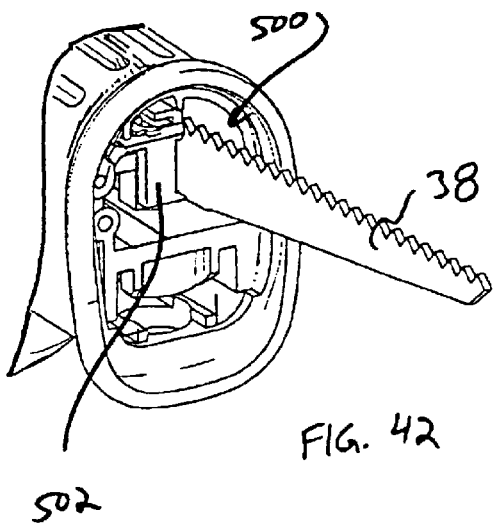
FIG. 42 is a perspective view illustrating a portion of the reciprocating saw of FIG. 41, the saw blade clamping arrangement shown operatively associated with the saw blade in a second orientation.
Figure 43A:
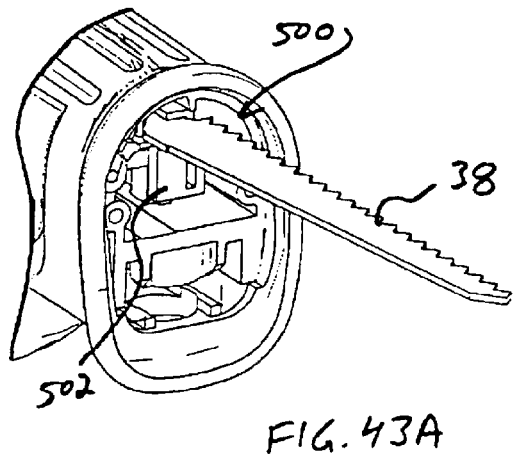
FIGS. 43A and 43B are a perspective view similar to FIG. 42 with the saw blade clamping arrangement shown operatively associated with the saw blade in a third orientation and a side view of the saw blade clamping arrangement securing the saw blade in the third orientation to a drive shaft of the tool, respectively.
Figure 43B:
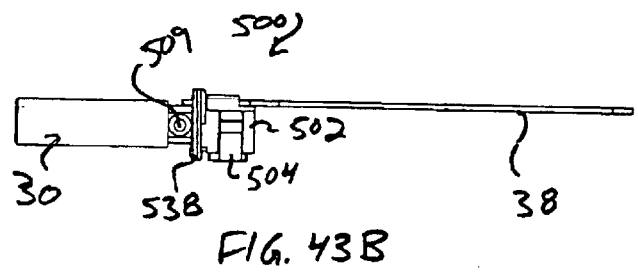
Figure 44:
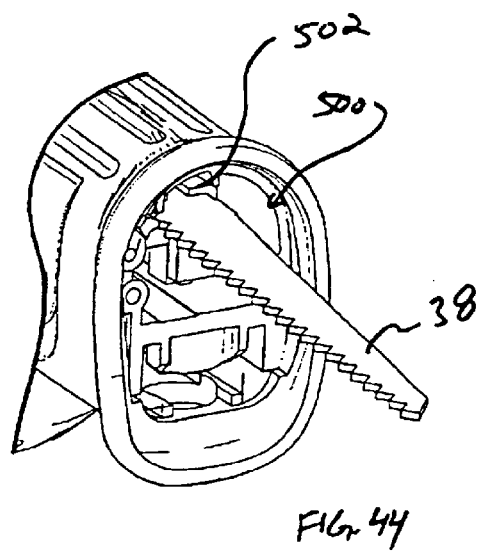
FIG. 44 is a perspective view similar to FIG. 42, the saw blade clamping arrangement shown operatively associated with the saw blade in a fourth orientation.
Figure 45:
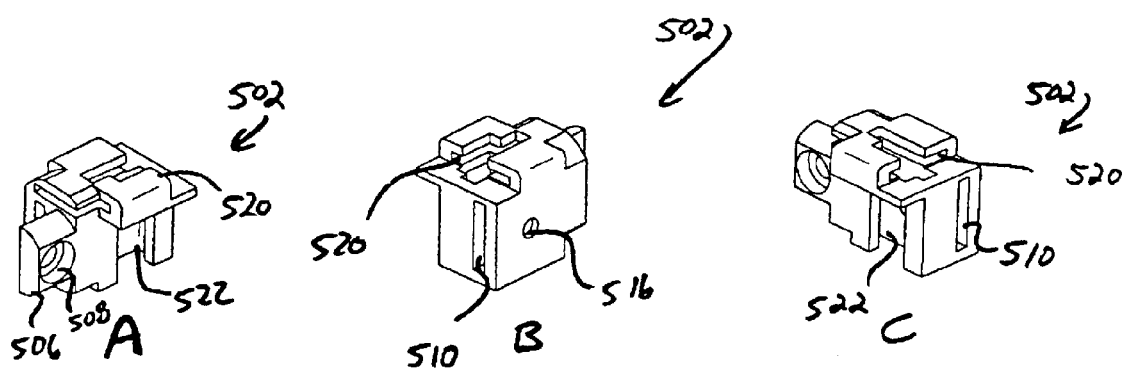
FIGS. 45A–45C are various views of a clamp base of the saw blade clamping arrangement of FIGS. 41–44.
Figure 46:
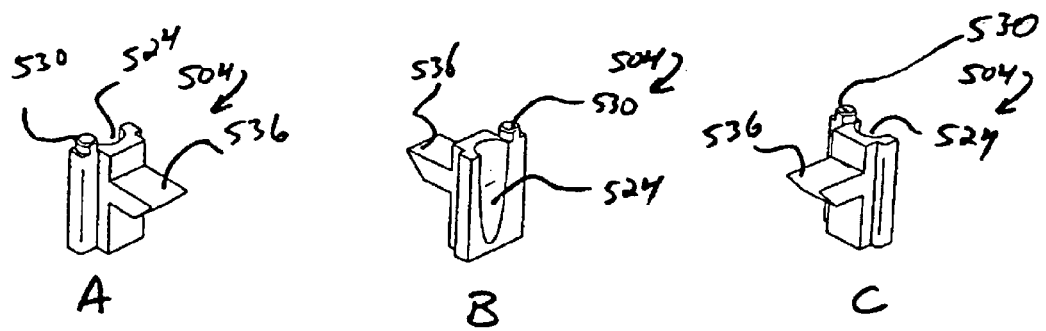
FIGS. 46A–46C are various views of a slider of the saw blade clamping arrangement of FIGS. 41–44.

Prior to addressing the specific construction and operation of the clamping arrangement 500, a brief understanding of the various saw blade orientations is warranted. FIG. 41 illustrates a first cutting position in which the blade 38 is disposed in a generally vertical plane and the teeth of the blade 38 are oriented downward. This blade orientation is typical of known reciprocating saws. FIG. 42 illustrates a second cutting position in which the blade 38 is again oriented in a generally vertical plane. In this second cutting position, the teeth of the blade 38 are oriented upward. FIG. 43 illustrates a third cutting position in which the blade 38 is oriented in a generally horizontal plane and thereby mutually perpendicular to the first and second cutting positions. FIG. 44 illustrates a fourth cutting position in which the blade 38 is again oriented in a generally horizontal plane. In this fourth cutting position, the teeth of the blade 38 are oriented in a direction opposite to the third cutting position of FIG. 43.

The clamping arrangement 500 is illustrated to generally include a clamp base or clamp support 502 and a control member or slider 504. The clamp base 502 includes a mounting portion 506 defining an aperture 508. In the preferred embodiment, the aperture 508 receives a fastener 509 (shown in FIG. 43B) for removably attaching the clamp base 502 to the reciprocating shaft 30 of the tool 10. Alternatively, the clamp base 502 may be press fit or otherwise suitable attached to the shaft 30.

The clamp base 502 defines a first or vertical slot 510 for receiving the blade 38 in either the first cutting position (as shown in FIG. 41) or the second cutting position (as shown in FIG. 42). As shown in connection with the prior embodiments of the present invention, the saw blade 38 includes a mounting portion 46 including an aperture 48. As perhaps shown most particularly in the cross-sectional views of FIGS. 47 and 48, the clamp base 502 defines an aperture or opening 512 that intersects the first slot 510 and is configured to receive a locking member or ball 514. In a manner to be addressed more specifically below, the locking ball 514 engages the aperture 46 of the saw blade 38 for securing the saw blade 38.

The clamp base further defines a hole 516. The hole 516 receives a locating pin 518 (see FIG. 47). The locating pin 518 extends into the opening 510 and cooperates with locking ball 514 to prevent inadvertent removal of the saw blade 38 from the slot 510. The locating pin 518 is adapted to seat in the aperture 46 of the blade 38 and accordingly serves to further lock the blade 38 in place. In this regard, the locating pin 518 prevents the locking ball 514 from being pushed out of the aperture 46 when the saw blade 38 is under severe loads.

The clamp base 502 is further illustrated to include a second or horizontal slot 520. The second slot 520 is operative to receive the saw blade 38 in the third cutting position (shown in FIG. 43) or the fourth cutting position (shown in FIG. 44). Significantly, the second slot 520 is spaced from the first slot 510. In this manner, the saw blade 38 is off center relative to the drive shaft 30 and positioned proximate a side wall of the tool housing. Such positioning of the saw blade 38 closer to the side wall of the tool housing facilitates flush cutting of a work piece with the saw blade 38.

The second slot 520 is intersected by a third slot 522 that slidably receives the slider 504. The slider or control member 504 is linearly translatable within the third slot in a direction substantially perpendicular to the direction of reciprocal motion of the driveshaft 30 between a first position and a second position. As will be explained further below, the slider 504 is operative for selectively urging the locking ball 514 into engagement with the saw blade 38 to thereby operatively engage the saw blade 38 with the drive shaft 30. In the first position, as shown specifically in the cross-sectional view of FIG. 47, the slider 504 urges the locking ball 514 into engagement with the saw blade 38. In this first position, the locking ball 514 is partially inserted into the aperture 46 from the first side of the saw blade 38. In its second position, as shown in the cross-sectional view of FIG. 48, the slider 504 is linearly translated downward and permits the locking ball 514 to be displaced from a position engaged with the aperture 46 of the saw blade 38. In this manner, removal and replacement of the saw blade 38 is permitted.

The slider 504 includes a first portion for selectively creating an operative connection between the saw blade 38 and the reciprocating drive shaft 30. In the embodiment illustrated, the first portion comprises a channel or camming slot 524 for at least partially receiving the locking ball 514. The channel 524 comprises a concavely curved trough defined by a camming surface which is angled such that the downward displacement of the slider 504 from the first position to the second position provides additional clearance for the locking ball 514 to accommodate movement away from the saw blade 38. Given the angular orientation of the channel 524, as the control member 504 is moved from its second position to its first position, the locking ball 514 is resultantly forced into the aperture 512 and toward the saw blade 38.

The slider 504 will be understood to be further operative to selectively retain the saw blade 38 relative to the drive shaft 30 when the saw blade 38 is in its third cutting position or fourth cutting position. In this regard, the slider 504 further includes a second portion 530 for selectively creating an operative connection between the saw blade 38 and the reciprocating drive shaft 30 when the saw blade 38 is in its third cutting position or fourth cutting position. In the embodiment illustrated, the second portion is an integrally formed pin 530. As perhaps shown most particularly in the cross-sectional view of FIG. 49, when the slider 504 is translated upward to its first position, the integrally formed pin 530 of the slider 504 engages an aperture of the saw blade 38. In this manner, the saw blade 38 is retained within the slot 520. Conversely, translation of the slider 504 from its first position downward to its second position, displaces the pin 530 from the saw blade 38 to permit removal and/or replacement of the saw blade 38.

Figure 47:
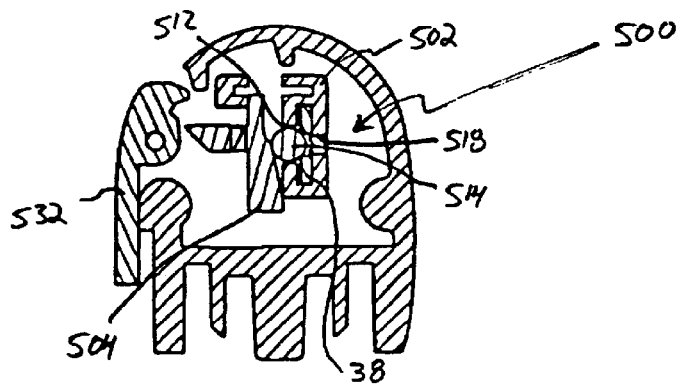
FIG. 47 is a cross-sectional view taken along the line 47—47 of FIG. 41.
Figure 48:
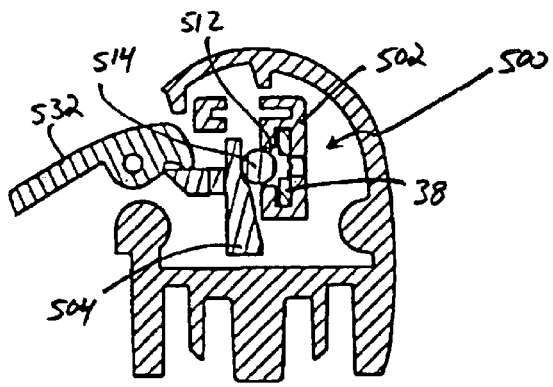
FIG. 48 is a cross-sectional view similar to FIG. 47, illustrating the lever articulated to a blade release position.
Figure 49:
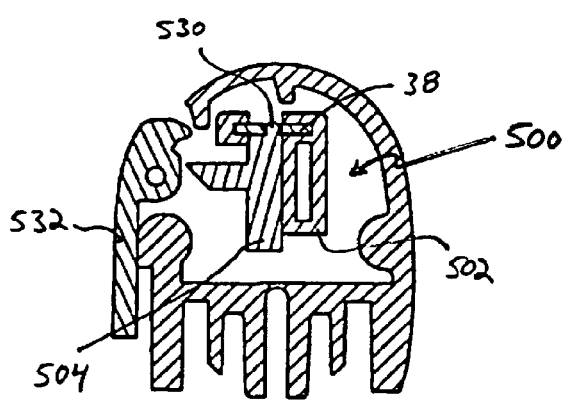
FIG. 49 is a cross-sectional view taken along the line 49—49 of FIG. 41.

As with the prior embodiments, the clamping arrangement 500 includes a release lever 532 which functions to translate the slider 504 from the first position to the second position. In a normal position (as shown in FIG. 41), the release lever 532 is spaced apart from a flange 536 of the slider 504. It will be appreciated that the release lever 532 does not reciprocate with the drive shaft 30 of the tool 10. The release lever 532 is movable (i.e., rotatable) to a second position (as shown in FIG. 48). In this second position, the release lever 130 displaces the slider 504 downward to its second position and thereby permits removal and replacement of the saw blade 38 in the manner discussed above. The slider 504 is biased upward (as shown in FIGS. 47 and 49) to its first position by a biasing member 538 (shown in FIG. 43B). The biasing member 538 is preferably a spring 538. A spring identical in construction and function is shown in FIG. 23 in connection with the third embodiment of the present invention and need not be described in connection with this embodiment.

Figure 50:
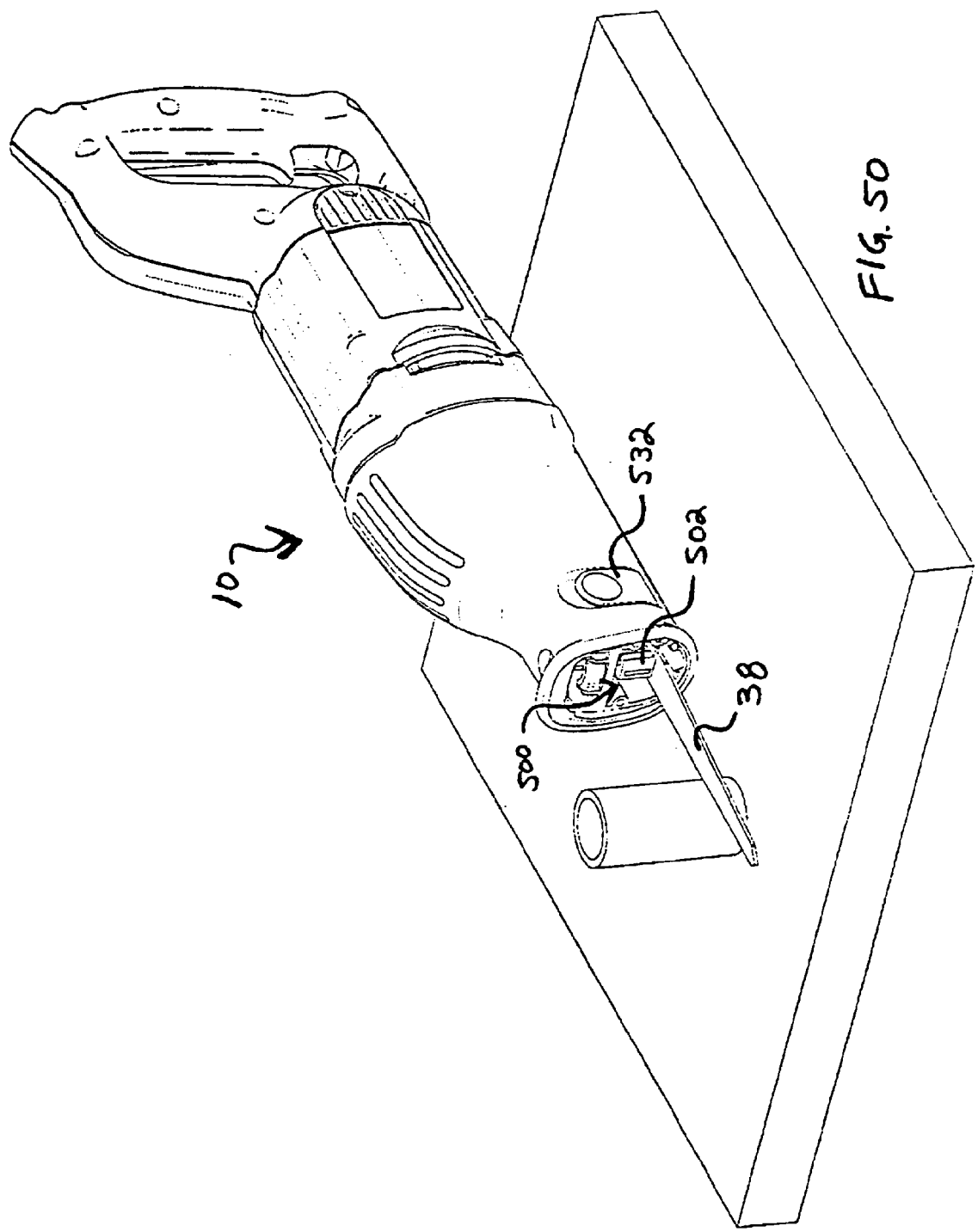
FIG. 50 is a perspective view of the reciprocating saw of FIG. 41, illustrating the saw blade in the third position and the reciprocating saw being used for flush-cutting of a work piece.

It will now be understood that the present invention provides the user of the tool 10 with improved flexibility to avoid obstacles that may be encountered by the handle, motor, or other parts of the tool 10 during cutting operations. In this regard, the saw blade 38 can be oriented in various ways relative to the geometry of the remainder of the tool 10 to minimize difficulties encountered with obstacles. One example of this aspect of the present invention is shown particularly in FIGS. 43A, 43B and 50. In FIG. 43B, the saw blade 38 is received by the clamp support 502 in the third orientation. The saw blade 38 is displaced from a longitudinal axis of the drive shaft 30. As a result, the saw blade 38 is positioned closer to a side wall of a housing of the tool 10 (see FIG. 43A). In FIG. 50, the tool 10 is being used with the blade 38 in this third orientation to flush-cut a work piece adjacent a wall portion or planar member. A more flush cut of the work piece is facilitated in this manner.

While the above description constitutes various preferred embodiments of the invention, it will be appreciated that the invention is susceptible to modification, variation, and change without departing from the proper scope or fair meaning of the accompanying claims. For example, it will be understood that the teachings of the present invention are directly applicable to other power tools having reciprocating drive shafts, including but not limited to jigsaws.

What is claimed is:

1. A saw blade clamping arrangement for a power tool including a housing, a drive shaft mounted for reciprocating motion relative to the housing, and a saw blade releasably interconnected with the drive shaft for reciprocating motion along a longitudinal axis, the saw blade clamping arrangement comprising:
a clamp support interconnected with the drive shaft; and
a control member connected to the clamp support, the control member including a first portion for selectively creating an operative connection between the saw blade and the drive shaft when the saw blade is positioned relative to the clamp support in a first of at least two distinct orientations, the control member further including a second portion for selectively creating an operative connection between the saw blade and the drive shaft when the saw blade is received by the clamp support in a second of the at least two distinct orientations, the control member being linearly movable between a first position creating the operative connection between the saw blade and the drive shaft and a second position permitting removal of the saw blade.

2. The saw blade clamping arrangement of claim 1, further comprising a release lever attached to the housing, the release lever being manually movable to control movement of the control member between the first position and the second position.

3. The saw blade clamping arrangement of claim 1, wherein the first portion is a ramp for engaging a ball.

4. The saw blade clamping arrangement of claim 1, wherein the second portion is a pin that directly engages the saw blade.

5. The saw blade clamping arrangement of claim 1, in combination with the tool.

6. A saw blade clamping arrangement for a power tool including a housing, a drive shaft mounted for reciprocating motion relative to the housing, and a saw blade releasably interconnected with the drive shaft for reciprocating motion along a longitudinal axis, the saw blade clamping arrangement comprising:
a clamp support for attachment to the drive shaft, the clamp support defining a first slot for receiving the saw blade in a first orientation and a second slot for receiving the saw blade in a second orientation, the first orientation being non-planar to the second orientation, the first slot being spaced from the second slot;
wherein the control member includes a first portion for selectively creating the operative connection between the saw blade and the drive shaft when the saw blade is received in the first slot and a second portion for selectively creating the operative connection between the saw blade and the drive shaft when the saw blade is received in the second slot.

7. The saw blade clamping arrangement of claim 6, wherein the control member is movable between a first position creating the operative connection between the saw blade and the drive shaft and a second position permitting removal of the saw blade.

8. The saw blade clamping arrangement of claim 7, wherein the control member is linearly movable between the first position and the second position.

9. The saw blade clamping arrangement of claim 6, wherein the first portion is a ramp for engaging a ball.

10. The saw blade clamping arrangement of claim 6, wherein the second portion is a pin that directly engages the saw blade.

11. A saw blade clamping arrangement for a power tool including a housing, a drive shaft mounted for reciprocating motion relative to the housing, and a saw blade releasably interconnected with the drive shaft for reciprocating motion along a longitudinal axis, the saw blade clamping arrangement comprising:
a clamp support interconnected with the drive shaft, the clamp support configured to selectively receive the saw blade in at least two non-planar orientations;
a control member connected to the clamp support, the control member for creating an operative connection between the saw blade and the drive shaft when the saw blade is received by the clamp support in any of the at least two non-planar orientations, the control member movable between a first position for creating the operative connection and a second position permitting removal of the saw blade; and
a release lever for mounting to the housing, the release lever normally spaced from the control member and manually movable to engage the control member and displace the control member from the first position to the second position.

12. The saw blade clamping arrangement of claim 11, wherein the control member includes a first portion for selectively creating the operative connection between the saw blade and the drive shaft when the saw blade is received by the clamp support in a first of the at least two non-planar orientations, the control member further including a second portion for selectively creating the operative connection between the saw blade and the drive shaft when the saw blade is received by the clamp support in a second of the at least two non-planar orientations.

13. The saw blade clamping arrangement of claim 11, wherein the control member is linearly movable between the first position and the second position.

14. The saw blade clamping arrangement of claim 11, wherein the at least two non-planar orientations includes first and second mutually perpendicular orientations.

15. The saw blade clamping arrangement of claim 12, wherein the clamp support defines a first slot for receiving the saw blade in a first orientation and a second slot for receiving the saw blade in a second orientation, the first slot being spaced from the second slot.

16. The saw blade clamping arrangement of claim 11, in combination with the tool.

17. The saw blade clamping arrangement of claim 1, wherein the second portion is spaced apart from the first portion.

18. The saw blade clamping arrangement of claim 1, wherein the at least two distinct orientations include first and second orientations, the first and second orientations being non-parallel.

19. The saw blade clamping arrangement of claim 1, wherein the at least two distinct orientations include first and second orientations, the first and second orientations being generally perpendicular.

20. The saw blade clamping arrangement of claim 1, wherein the saw blade clamping arrangement is keyless.

21. The saw blade clamping arrangement of claim 6, wherein the saw blade is spaced apart from the reciprocating shaft in a direction perpendicular to the longitudinal axis when the saw blade is in at least one of the first and second orientations.

22. The saw blade clamping arrangement of claim 21, wherein the clamp support at least partially defines a wall adjacent a flat side of the saw blade opposite the reciprocating shaft.

23. The saw blade clamping arrangement of claim 6, wherein the first and second orientations are generally perpendicular.

24. The saw blade clamping arrangement of claim 11, wherein the at least two non-planar orientations are non-parallel orientations.

25. A method of preparing a power tool for flush cutting of a work piece, the power tool including a housing, a drive shaft mounted for reciprocating motion relative to the housing along a longitudinal axis, a saw blade, and a clamp support interconnected with the drive shaft, the clamp support configured to selectively receive the saw blade in at least two distinct orientations, the method comprising the steps of:

providing a common control member for selectively securing the saw blade in the at least two distinct orientations, the control member carried by the clamp support and movable from a first position to a second position;

moving the control member from the first position to the second position so as to release the saw blade from a first orientation of the at least two distinct orientations;

removing the saw blade from the first orientation and inserting the saw blade into the clamp support in a second orientation of the at least two distinct orientations, the second orientation being spaced from the first orientation; and linearly translating the control member to the second position so as to secure the saw blade in the second orientation.

26. The method of claim 25, wherein the step of moving the control member to the second position so as to secure the saw blade in the second orientation includes the step of securing the saw blade in an orientation spaced from the reciprocating shaft in a direction perpendicular to the longitudinal axis.

27. The method of claim 25, further comprising the step of securing the saw blade relative to the drive shaft with an element at least partially extending through an aperture in the saw blade.

28. The method of claim 27, wherein the element is a pin.

29. The method of claim 27, wherein the element is a ball.

30. The method of claim 25, further comprising the steps of:

securing the saw blade relative to the drive shaft in the first orientation with a first portion of the control member; and securing the saw blade relative to the drive shaft in the second orientation with a second portion of the control member.

31. The method of claim 30, wherein the first portion is a pin.

32. The method of claim 30, wherein the second portion is a ramp engaging a ball.

33. The method of claim 30, wherein the first portion is a pin and the second portion is a ball.

34. The method of claim 30, wherein the first portion is spaced from the second portion.

35. The method of claim 25, wherein the first orientation is generally perpendicular to the second orientation.

36. A saw blade clamping arrangement for a power tool including a housing, a drive shaft mounted for reciprocating motion relative to the housing, and a saw blade releasably interconnected with the drive shaft for reciprocating motion along a longitudinal axis, the saw blade clamping arrangement comprising:

a clamp support interconnected with the drive shaft; and a control member connected to the clamp support, the control member for creating a first operative connection between the saw blade and the drive shaft when the saw blade is positioned relative to the clamp support in a first of at least two distinct orientations and a second operative connection between the saw blade and the drive shaft when the saw blade is positioned relative to the clamp support in a second of the at least two distinct orientations;

wherein at least one of the first and second operative connections is a pinned connection in which an element extends at least partially into an aperture of the saw blade;

wherein the first slot is spaced from and generally perpendicular to the second slot.

37. The saw blade clamping arrangement for a power tool of claim 36, wherein both of the first and second operative connections are pinned connections.

38. The saw blade clamping arrangement for a power tool of claim 36, wherein the control member includes a pin and the first operative connection is established by the pin at least partially extending through the aperture in the saw blade.

39. The saw blade clamping arrangement for a power tool of claim 36, wherein the control member includes a ramp and the ramp forces a ball at least partially into the aperture of the saw blade to establish the second operative connection.

40. The saw blade clamping arrangement for a power tool of claim 36, wherein the control member includes a pin and the first operative connection is established by the pin at least partially extending through the aperture in the saw blade and further wherein the control member includes a ramp and the ramp forces a ball at least partially into the aperture of the saw blade to establish the second operative connection.

41. The saw blade clamping arrangement for a power tool of claim 36, wherein the saw blade is spaced from the drive shaft in a direction perpendicular to the longitudinal axis when the saw blade is in at least one of the first and second distinct orientations.

42. The saw blade clamping arrangement for a power tool of claim 36, wherein the control member defines a first slot for receiving the saw blade in the first distinct orientation and a second slot for receiving the saw blade in the second distinct orientation.

43. A saw blade clamping arrangement for a power tool including a housing, a drive shaft mounted for reciprocating motion relative to the housing, and a saw blade releasably interconnected with the drive shaft for reciprocating motion along a longitudinal axis, the saw blade clamping arrangement comprising:

a clamp support interconnected with the drive shaft; and a control member connected to the clamp support, the control member including a first portion for selectively creating an operative connection between the saw blade and the drive shaft when the saw blade is positioned relative to the clamp support in a first of at least two distinct orientations, the control member further including a second portion for selectively creating an operative connection between the saw blade and the drive shaft when the saw blade is received by the clamp support in a second of the at least two distinct orientations, the first portion being a ramp for engaging a ball.

44. A saw blade clamping arrangement for a power tool including a housing, a drive shaft mounted for reciprocating motion relative to the housing, and a, saw blade releasably interconnected with the drive shaft for reciprocating motion along a longitudinal axis, the saw blade clamping arrangement comprising:

a clamp support interconnected with the drive shaft; and a control member connected to the clamp support, the control member including a first portion for selectively creating an operative connection between the saw blade and the drive shaft when the saw blade is positioned relative to the clamp support in a first of at least two distinct orientations, the control member further including a second portion for selectively creating an operative connection between the saw blade and the drive shaft when the saw blade is received by the clamp support in a second of the at least two distinct orientations, the second portion being a pin that directly engages the saw blade.

* * * * *